(12) United States Patent
Hamabe et al.

(10) Patent No.: US 9,873,364 B2
(45) Date of Patent: Jan. 23, 2018

(54) VEHICLE SEAT

(71) Applicant: TOYOTA JIDOSHA KABUSHIKI KAISHA, Toyota-shi, Aichi (JP)

(72) Inventors: Tsutomu Hamabe, Nisshin (JP); Kohshi Katoh, Hadano (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/629,838

(22) Filed: Feb. 24, 2015

(65) Prior Publication Data

US 2015/0239381 A1 Aug. 27, 2015

(30) Foreign Application Priority Data

Feb. 26, 2014 (JP) .................. 2014-035346

(51) Int. Cl.
| | |
|---|---|
| *A47C 3/00* | (2006.01) |
| *A47C 7/46* | (2006.01) |
| *B60N 2/68* | (2006.01) |
| *B60N 2/70* | (2006.01) |
| *B60N 2/39* | (2006.01) |
| *B64D 11/06* | (2006.01) |
| *A47C 7/32* | (2006.01) |
| *A47C 7/22* | (2006.01) |

(Continued)

(52) U.S. Cl.
CPC .............. *B60N 2/68* (2013.01); *B60N 2/39* (2013.01); *B60N 2/70* (2013.01); *B60N 2/7094* (2013.01); *A47C 7/22* (2013.01); *A47C 7/32* (2013.01); *B60N 2/682* (2013.01); *B60N 2/7011* (2013.01); *B60N 2/72* (2013.01); *B60N 2002/0208* (2013.01); *B60N 2002/684* (2013.01); *B64D 11/06* (2013.01); *B64D 11/0649* (2014.12); *B64D 11/0691* (2014.12)

(58) Field of Classification Search
CPC .... B60N 2/68; B60N 2002/684; B60N 2/682; B60N 2/7011; B60N 2/72; B60N 2/70; A47C 7/32; A47C 7/22; A47C 7/425; B64D 11/06; B64D 11/0649; B64D 11/0691
USPC ... 297/284.4, 284.1, 452.18, 452.13, 452.52, 297/452.5, 452.44, 452.45, 452.53
See application file for complete search history.

(56) References Cited

U.S. PATENT DOCUMENTS

| 1,457,245 | A | * | 5/1923 | Polk ....................... | A47C 7/425 297/382 |
| 2,812,146 | A | * | 11/1957 | Chaplin ................. | B64D 11/06 244/122 R |

(Continued)

FOREIGN PATENT DOCUMENTS

| GB | 2316304 A | 2/1998 |
| JP | 10-057187 A | 3/1998 |

(Continued)

*Primary Examiner* — Chi Q Nguyen
(74) *Attorney, Agent, or Firm* — Andrews Kurth Kenyon LLP

(57) ABSTRACT

To improve steering operability in a driver's seat, and to improve posture maintaining capability at the time of turning in the driver's seat and a seat other than the driver's seat. In a vehicle seat including a seat, a seat backrest, and a headrest, the seat backrest has a seat backrest frame formed in a frame shape and a net disposed to stretch in the seat backrest frame. The net has a first string portion arranged radially.

5 Claims, 24 Drawing Sheets

(51) Int. Cl.
 *B60N 2/72* (2006.01)
 *B60N 2/02* (2006.01)

(56) References Cited

U.S. PATENT DOCUMENTS

| | | | | |
|---|---|---|---|---|
| 4,602,819 A * | 7/1986 | Morel | ............ | B60N 2/66 297/452.56 |
| 4,627,661 A * | 12/1986 | Ronnhult | ............ | B60N 2/66 297/284.4 |
| 5,806,910 A * | 9/1998 | DeRees | ............ | B60N 2/0284 244/122 R |
| 5,823,620 A * | 10/1998 | Le Caz | ............ | B60N 2/66 297/284.2 |
| 5,976,664 A | 11/1999 | Lohmeyer | | |
| 6,022,074 A * | 2/2000 | Swedenklef | ............ | B60N 2/2222 297/216.13 |
| 6,056,366 A * | 5/2000 | Haynes | ............ | B60N 2/688 297/216.1 |
| 6,193,311 B1 * | 2/2001 | Payton | ............ | B60N 2/2812 297/250.1 |
| 6,712,427 B1 * | 3/2004 | Bourdkane | ............ | A47C 7/465 297/284.4 |
| 7,083,233 B2 * | 8/2006 | Massara | ............ | B60N 2/66 297/284.4 |
| 7,905,545 B2 * | 3/2011 | Andersson | ............ | B60N 2/0232 297/180.1 |
| 8,931,838 B2 * | 1/2015 | Kramm | ............ | B60N 2/2809 297/253 |
| 2010/0259089 A1 * | 10/2010 | Mizobata | ............ | B60N 2/7011 297/452.56 |
| 2013/0169020 A1 * | 7/2013 | Raz | ............ | B60N 2/24 297/440.15 |
| 2014/0028074 A1 | 1/2014 | Imamura | | |
| 2014/0191550 A1 * | 7/2014 | Katoh | ............ | B60N 2/48 297/337 |
| 2015/0108820 A1 * | 4/2015 | Fujita | ............ | B60N 2/7011 297/452.48 |
| 2015/0367756 A1 * | 12/2015 | Katoh | ............ | B60N 2/666 297/285 |
| 2016/0009199 A1 * | 1/2016 | Hamabe | ............ | B60N 2/028 297/452.18 |

FOREIGN PATENT DOCUMENTS

| | | |
|---|---|---|
| JP | 2003-169725 A | 6/2003 |
| JP | 2005-160558 A | 6/2005 |
| JP | 2007-008272 A | 1/2007 |
| JP | 2010-089582 A | 4/2010 |
| JP | 2014-133479 A | 7/2014 |
| JP | 2014-151766 A | 8/2014 |
| JP | 2014-151769 A | 8/2014 |
| JP | 2014-151780 A | 8/2014 |
| JP | 2014-151791 A | 8/2014 |
| JP | 2014-169067 A | 9/2014 |
| JP | 5598557 B2 | 10/2014 |
| WO | 03/031223 A1 | 4/2003 |
| WO | 2013/021497 A1 | 2/2013 |
| WO | 2013160990 A1 | 10/2013 |
| WO | 2014/108790 A1 | 7/2014 |
| WO | 2015011803 A1 | 1/2015 |

* cited by examiner

VEHICLE SEAT

CROSS-REFERENCE TO RELATED APPLICATION

The present application claims priority to Japanese Patent Application No. 2014-035346 filed on Feb. 26, 2014, which is incorporated herein by reference in its entirety.

BACKGROUND OF THE INVENTION

Field of the Invention

The present invention relates to a vehicle seat mounted on a vehicle.

Related Background Art

A vehicle seat disclosed in Japanese Unexamined Patent Application Publication No. 2010-089582 has a configuration in which a mesh-shaped (lattice-shaped) net is disposed to stretch in a pair of frame members of a seat backrest so that a bending provider for bending the net is attached to a rear surface of the net. In this manner, the net is bent by the bending provider so as to have a shape which fits a body shape of a user. As a result, a sense of fit felt by the user for the net is improved, and a pressure difference partially decreases between the net and the user, thereby allowing a seat to be comfortable when the user is seated.

Incidentally, when a driver sitting on a vehicle seat serving as a driver's seat performs a steering operation using a steering wheel, a vehicle occupant tries to pivotally move his or her upper body in a roll direction of a vehicle. However, the vehicle seat disclosed in Japanese Unexamined Patent Application Publication No. 2010-089582 is configured so that a mesh-shaped net supports the upper body of the vehicle occupant. Consequently, this configuration inhibits the vehicle occupant from pivotally moving his or her upper body.

In addition, the vehicle occupant sitting on the driver's seat or the vehicle seat other than the driver's seat is deviated outward in a turning direction due to lateral acceleration applied thereto at the time of turning. However, the vehicle seat disclosed in Japanese Unexamined Patent Application Publication No. 2010-089582 does not consider posture maintaining capability at this time of turning.

For this reason, this field of technology leaves room for improvement in steering operability in the driver's seat, and leaves room for improvement in the posture maintaining capability at the time of turning in the driver's seat and the seat other than the driver's seat.

A vehicle seat according to an aspect of the present invention includes a seat backrest that has a seat backrest frame formed in a frame shape and a net disposed to stretch in the seat backrest frame. The net has a first string portion arranged radially.

According to the vehicle seat in an aspect of the present invention, the net having the first string portion is disposed to stretch in the seat backrest frame formed in the frame shape. Accordingly, a vehicle occupant sitting on the vehicle seat leans against the first string portion configuring the net. Then, since the first string portion configuring the net is arranged radially, the vehicle occupant sitting on the vehicle seat can pivotally move his or her upper body around the connection portion. As a result, when the vehicle occupant (driver) sitting on the vehicle seat serving as a driver's seat performs a steering operation, the vehicle occupant can pivotally move his or her upper body in a roll direction of a vehicle, and thus can adopt a posture which enables the vehicle occupant to perform a comfortable steering operation. In addition, the vehicle occupant sitting on the vehicle seat which is the driver's seat or the seat other than the driver's seat is deviated outward in a turning direction due to lateral acceleration applied thereto at the time of turning. However, a scapula of the vehicle occupant which comes into contact with the first string portion at a position offset from the connection portion is displaced in a pivotal movement direction around the connection portion. Accordingly, a head of the vehicle occupant is moved less. Moreover, the vehicle occupant can adopt a posture excellent in posture maintaining capability at the time of turning by pivotally moving the scapula in the pivotal movement direction around the connection portion. In this manner, steering operability is improved in the driver's seat, and the posture maintaining capability at the time of turning is improved in the driver's seat and the seat other than the driver's seat.

As an embodiment, the first string portion may extend radially from a connection portion, and the connection portion may be located higher than a vertical center of the seat backrest frame. In this way, the connection portion is arranged at a position higher than the vertical center of the seat backrest frame. Accordingly, the vehicle occupant sitting on the vehicle seat can pivotally move his or her upper body around the vicinity of the scapula while leaning against the first string portion configuring the net. As a result, when the vehicle occupant (driver) sitting on the vehicle seat serving as a driver's seat performs a steering operation, the vehicle occupant can pivotally move his or her upper body around the vicinity of the scapula in the roll direction of the vehicle, and thus can adopt a posture which enables the vehicle occupant to perform the comfortable steering operation. In addition, the vehicle occupant sitting on the vehicle seat which is the driver's seat or the seat other than the driver's seat can adopt a posture excellent in posture maintaining capability at the time of turning with the head being moved less by pivotally moving his or her upper body in the roll direction around the vicinity of the scapula.

As an embodiment, the connection portion may be located at a horizontal center of the seat backrest frame. In this way, the connection portion is located at the horizontal center of the seat backrest frame. Accordingly, the connection portion can oppose a portion between the scapulae on the right and the left sides. This enables the vehicle occupant sitting on the vehicle seat to pivotally and more smoothly move his or her upper body.

In addition, as an embodiment, the net may further have a second string portion which is connected to the first string portion arranged radially. In this way, the first string portion arranged radially is connected to the second string portion. Accordingly, if any one of the first string portions is pivotally moved and displaced around the connection portion, the pivotally moved displacement is transferred to the other one of the first string portions via the second string portion, and the other one of the first string portion is also pivotally moved and displaced around the connection portion. For example, when the connection portion opposes a portion between the scapulae on the right and the left sides, it is possible to move the scapula on the right side and the scapula on the left side around the connection portion in directions opposite to each other. Accordingly, his or her upper body can be moved pivotally and more smoothly.

In addition, as an embodiment, the first string portion may extend radially from the connection portion, and the second string portion may be arranged in an annular shape which surrounds the connection portion. In this way, displacement of the first string portion is transferred to the overall net by arranging the second string portion in the annular shape which surrounds the connection portion. Accordingly, the upper body can be moved pivotally and more smoothly.

In addition, as an embodiment, the vehicle seat may further include a seat that is configured to be pivotally movable. A pivot axis of the seat may extend in a longitudinal direction of the vehicle seat, and may pass the vicinity of a waist of a vehicle occupant sitting on the seat. In this way, the seat is configured to be pivotally movable. The pivot axis of the seat extends in the longitudinal direction of the vehicle seat, and passes the vicinity of the waist of the vehicle occupant sitting on the seat. Accordingly, the vehicle occupant can pivotally move his or her upper body while pivotally moving his or her pelvis by twisting his or her lumbar spine. This enables the vehicle occupant to adopt a posture which enables the comfortable steering operation and a posture excellent in the posture maintaining capability at the time of turning. Therefore, the steering operability and the posture maintaining capability of the vehicle occupant at the time of turning are further improved.

According to an aspect and an embodiment of the present invention, it is possible to improve steering operability in a driver's seat, and to improve posture maintaining capability at the time of turning in the driver's seat and a seat other than the driver's seat.

BRIEF DESCRIPTION OF THE DRAWINGS

FIG. 8(a) illustrates a case where a force in an axial direction is input, and FIG. 8(b) illustrates a case where a force in a bending direction is input, respectively.

DESCRIPTION OF THE PREFERRED EMBODIMENTS

Figure 1:
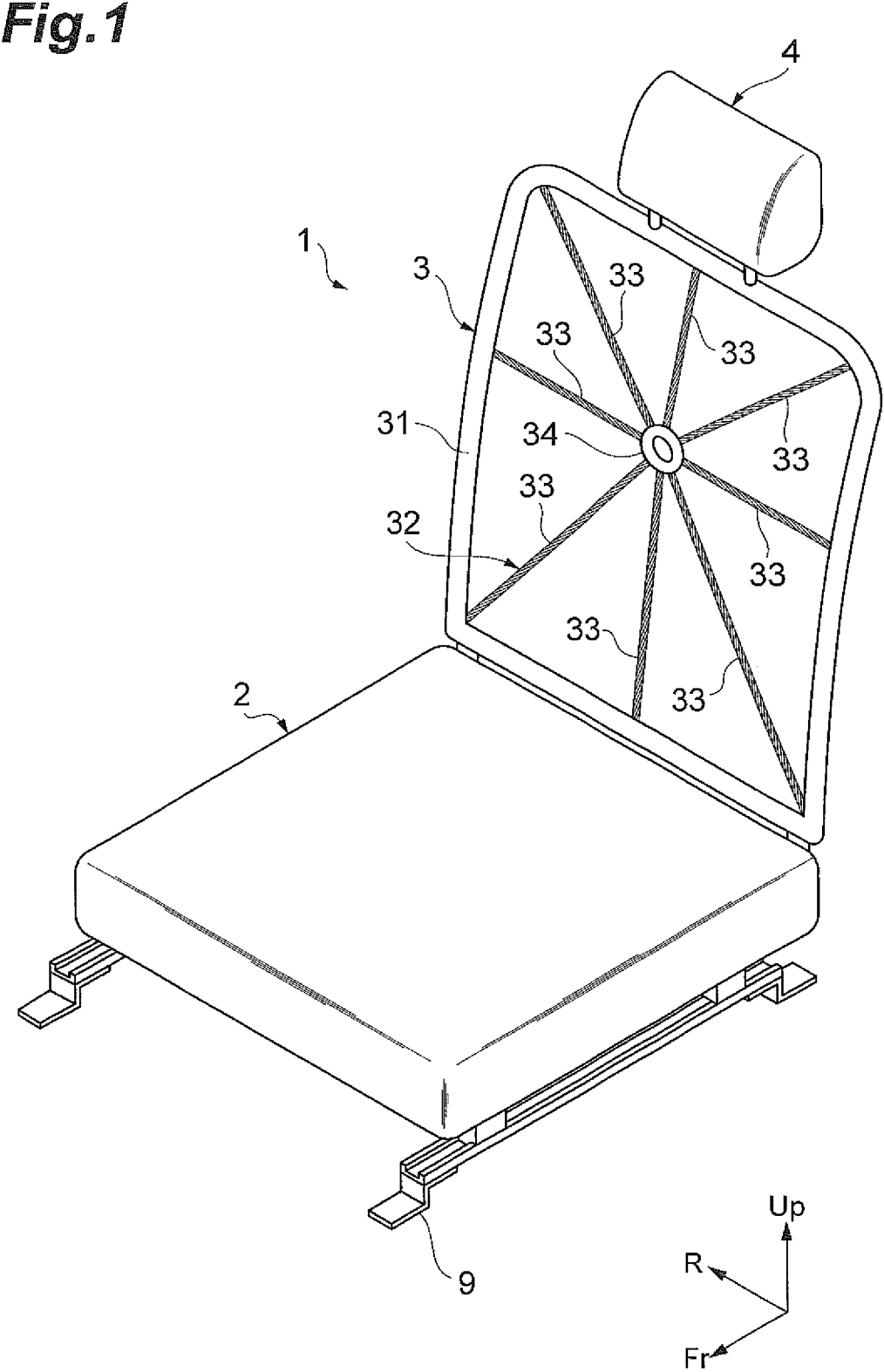
FIG. 1 is a perspective view illustrating a vehicle seat according to a first embodiment.

Hereinafter, a vehicle seat according to embodiments will be described with reference to the drawings. The vehicle seat according to the present embodiments is a seat which is installed in a vehicle and on which a vehicle occupant of the vehicle sits. Specifically, a driver's seat, a front passenger's seat, and a rear seat are included therein. In the following description, vertical and horizontal directions represent vertical and horizontal directions of the vehicle seat unless otherwise designated. In each drawing, "Up" represents an upper side of the vehicle seat, "Fr" represents a front side of the vehicle seat, and "R" represents a right side of the vehicle seat. In addition, in each drawing, the same reference numerals are given to the same or equivalent elements, and the repeated description will be omitted.

First Embodiment

FIG. 1 is a perspective view illustrating the vehicle seat according to a first embodiment. As illustrated in FIG. 1, the vehicle seat 1 according to the first embodiment is slidably attached to a rail 9 fixed onto a floor of the vehicle. A vehicle seat 1 includes a seat 2 on which the pelvis and the thighbone of the vehicle occupant are placed when the vehicle occupant sits thereon, a seat backrest 3 which supports the back of the vehicle occupant from behind the vehicle occupant, and a headrest 4 which supports the head of the vehicle occupant from behind the vehicle occupant. The seat backrest 3 is connected to a rear end part of the seat 2, and the headrest 4 is connected to an upper end part of the seat backrest 3.

Figure 2:
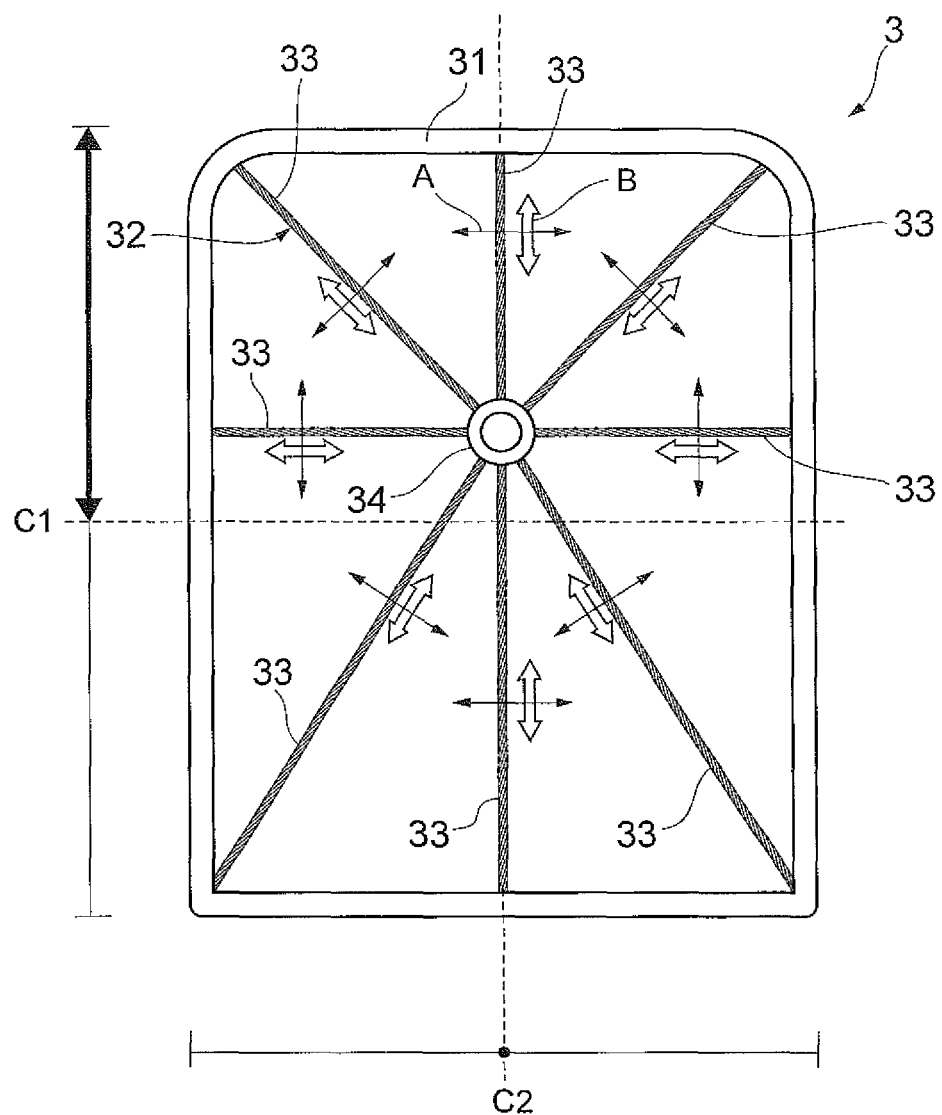
FIG. 2 is a front view of a seat backrest.

FIG. 2 is a front view of the seat backrest. As illustrated in FIGS. 1 and 2, the seat backrest 3 includes a seat backrest frame 31 formed in a frame shape and a net 32 disposed to stretch in the seat backrest frame 31.

The seat backrest frame 31 is a frame-shaped member forming a skeletal structure of the seat backrest 3, and has sufficient rigidity for supporting the vehicle occupant sitting on the vehicle seat 1 from behind. A shape, a structure, and a material of the seat backrest frame 31 are not particularly limited, but can be appropriately changed. In addition, the seat backrest frame 31 may be configured to have a single member, or may be configured to have multiple members.

Figure 3:
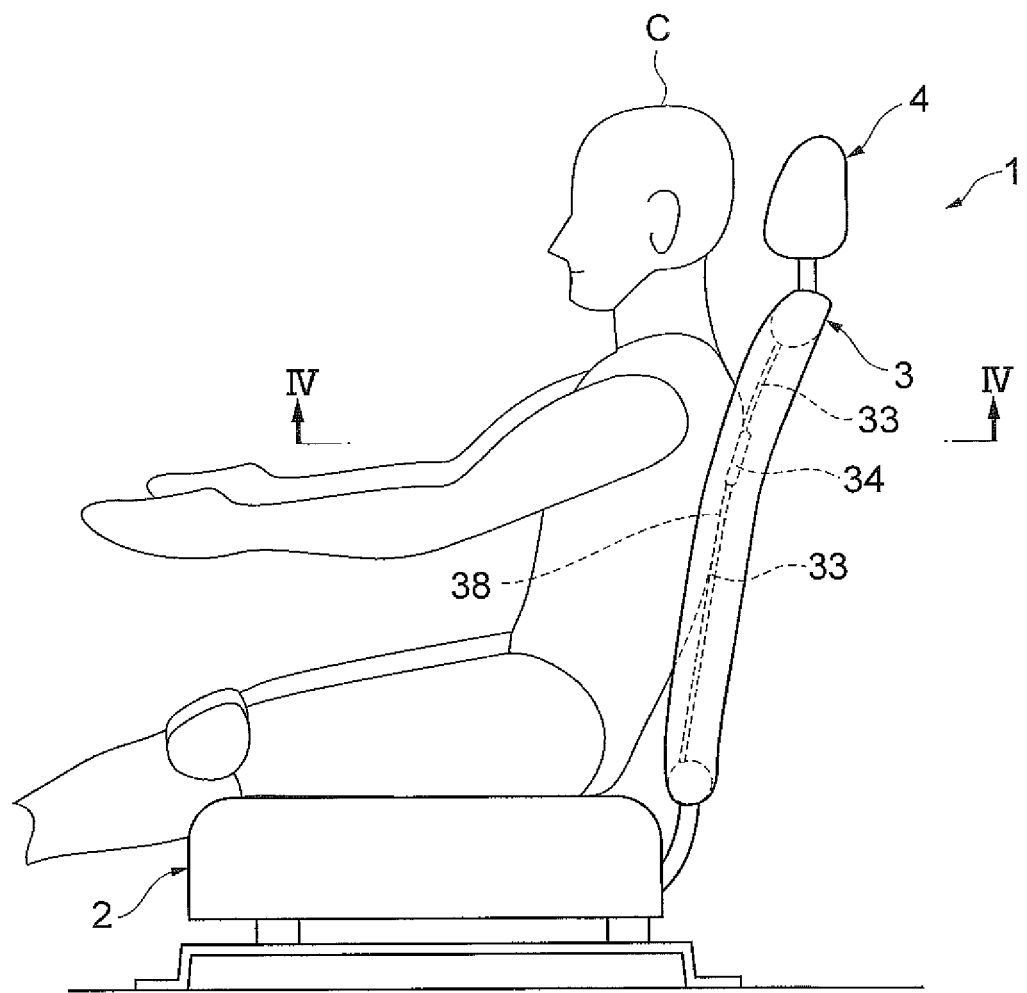
FIG. 3 is a side view illustrating a state where a vehicle occupant sits on the vehicle seat.
Figure 4:
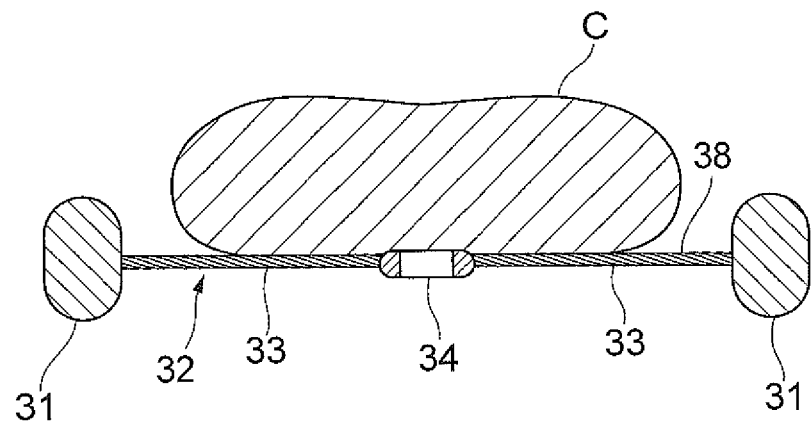
FIG. 4 is a cross-sectional view taken along line IV-IV illustrated in FIG. 3.

FIG. 3 is a side view illustrating a state where the vehicle occupant sits on the vehicle seat. FIG. 4 is a cross-sectional view taken along line IV-IV illustrated in FIG. 3. As illustrated in FIGS. 1 to 4, the net 32 is formed radially, and has a backrest surface 38 with which the back of a vehicle occupant C comes into contact when the vehicle occupant C sitting on the vehicle seat 1 leans against the seat backrest. Then, the net 32 has a plurality of first string portions 33 arranged radially within the backrest surface 38 of the seat backrest 3. The first string portion 33 is configured to have an elastic elongated member. A property, a material, a shape, a size, a length, and the number can be set appropriately. In addition, the first string portions 33 may be appropriately covered with a cover.

One end portion on the radially distal end side of the first string portion 33 is connected to the seat backrest frame 31, and the other end portion on the radial center side of the first string portion 33 is connected to a connection member 34. That is, the connection member 34 serves as a connection portion to which the first string portions 33 are connected on the radial center side. The first string portions 33 extend radially from the connection member 34 serving as the connection portion.

The connection member 34 can be located at a position higher than a vertical center C1 of the seat backrest frame. To be more specific, since the seat backrest 3 is a part against which the vehicle occupant sitting on the seat 2 leans, the seat backrest 3 extends in a direction away from the seat 2. Then, since the direction away from the seat 2 is an extending direction of the seat backrest 3, the vertical center C1 of the seat backrest frame is the center in the extending direction of the seat backrest frame. In addition, a side on which the headrest 4 is arranged is the distal end side of the seat backrest 3. Therefore, a position higher than the vertical center C1 of the seat backrest frame in which the connection member 34 is arranged can also be referred to as a distal end side position from the center in the extending direction of the seat backrest 3 (center in the extending direction).

Figure 5:
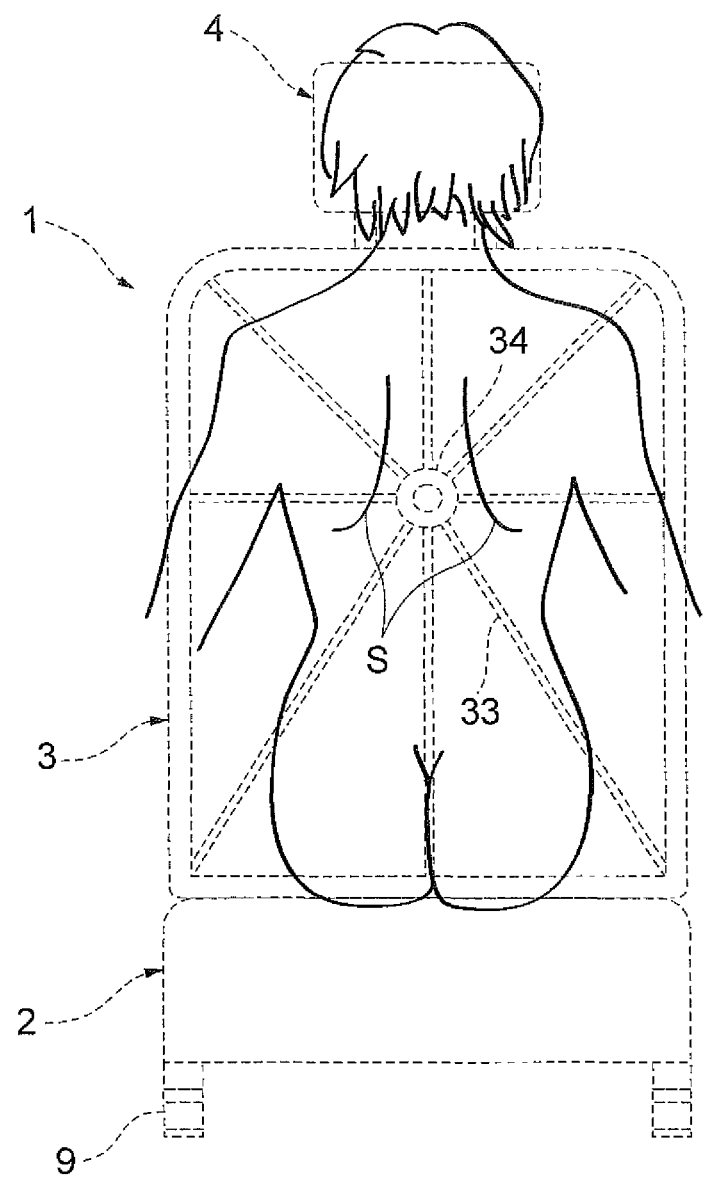
FIG. 5 is a view illustrating the back of the vehicle occupant sitting on the vehicle seat.

FIG. 5 is a view illustrating the back of the vehicle occupant sitting on the vehicle seat. As illustrated in FIG. 5, the connection member 34 is arranged at a horizontal center C2 (refer to FIG. 2) of the seat backrest frame 31, and can be located at a position opposing a portion between scapulae S on the right and the left sides of the vehicle occupant C sitting on the vehicle seat 1. However, the connection member 34 may be located at any desired position. For example, the connection member 34 may be located at a position close to the right side or the left side from the horizontal center C2 of the seat backrest frame 31. In addition, the connection member 34 may be located at a position of the vertical center C1 of the seat backrest frame 31 or at a position below the vertical center C1 of the seat backrest frame 31.

The number of the first string portions 33 arranged radially can be appropriately set within a range which can support the upper body of the vehicle occupant. For example, as illustrated in FIGS. 1 and 2, the number can be eight. Angles formed between the adjacent first string portions 33 may be the same as each other in the overall net 32, or may be different from each other.

Figure 6:
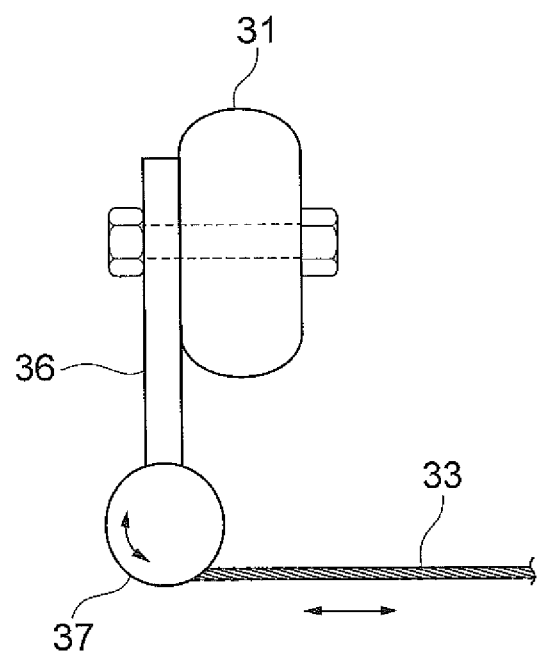
FIG. 6 is a view illustrating a state where a first string portion is connected to a seat backrest frame by a fastening-unfastening member.

A method of connecting the first string portions 33 to the seat backrest frame 31 is not particularly limited. For example, the first string portions 33 may be directly connected to the seat backrest frame 31. In addition, the first string portions 33 may be indirectly connected to the seat backrest frame 31 via an auxiliary member such as a bracket. FIG. 6 is a view illustrating a state where the first string portion is connected to the seat backrest frame using a fastening-unfastening member. As illustrated in FIG. 6, a fastening-unfastening member 37 which fastens or unfastens the first string portion 33 may be attached to an auxiliary member 36 such as a bracket which is attached to the seat backrest frame 31, and the first string portion 33 may be connected to the seat backrest frame 31 via the fastening-unfastening member 37. The fastening-unfastening member 37 is attached to the auxiliary member 36 (seat backrest frame 31) so as to be pivotally movable, and the distal end portion of the first string portion 33 is fixed to the fastening-unfastening member 37 so as not fall out therefrom. Therefore, the first string portion 33 can be fastened or unfastened by turning the fastening-unfastening member 37. Then, it is possible to increase tensile strength of the fastened first string portion 33 by turning the fastening-unfastening member 37 and fastening the first string portion 33. It is possible to decrease the tensile strength of the unfastened first string portion 33 by turning the fastening-unfastening member 37 and unfastening the first string portion 33.

The shape and size of the connection member 34 are not particularly limited. For example, as the shape of the connection member 34, a ring shape, a disc shape, and a polygonal shape can be employed. The connection member 34 is arranged on the radial center side of the first string portions 33 where the first string portions 33 are densely collected. Accordingly, in view of workability for connecting the first string portion 33, the size of the connection member 34 may be determined.

A method of connecting each of the first string portions 33 to the connection member 34 is not particularly limited. For example, a hook (not illustrated) may be attached to the distal end of the first string portion 33 so that the hook is caught on the ring-shaped connection member 34 or on a hole formed in the connection member 34. In addition, the first string portion 33 may be fastened through the ring-shaped connection member 34 or through the hole formed in the connection member 34.

Figure 7:
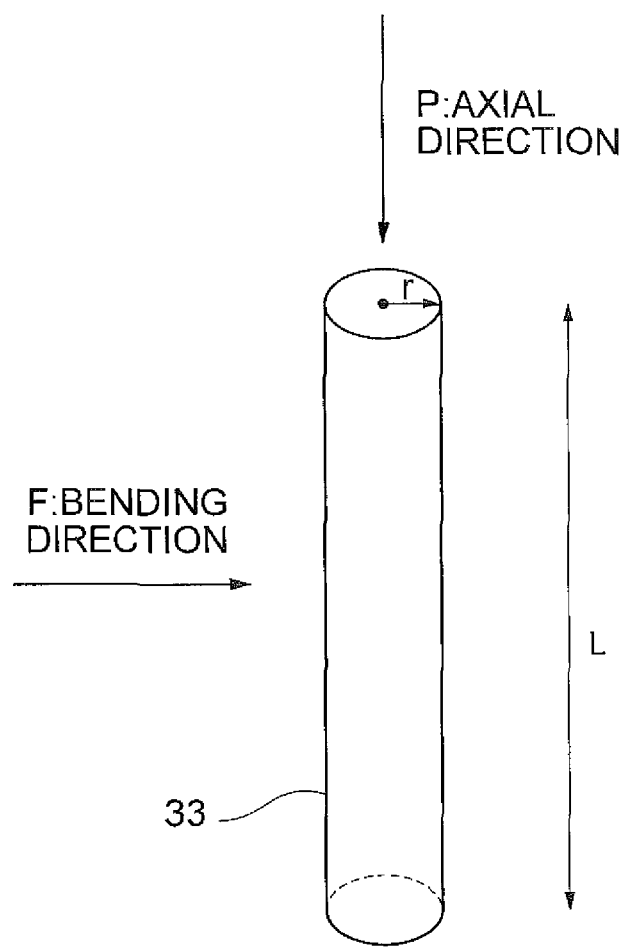
FIG. 7 is a diagram for illustrating rigidity of a linear member.
Figure 8A:
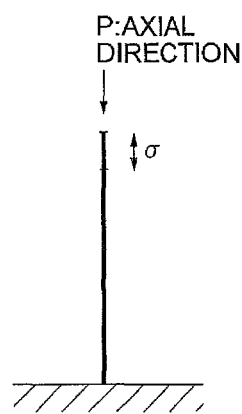
FIG. 8(a) and FIG. 8(b) are a diagram for illustrating stress applied to the first string portion.
Figure 8B:
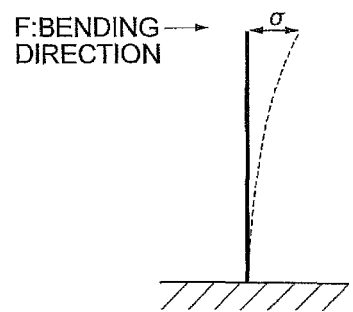
Figure 9:
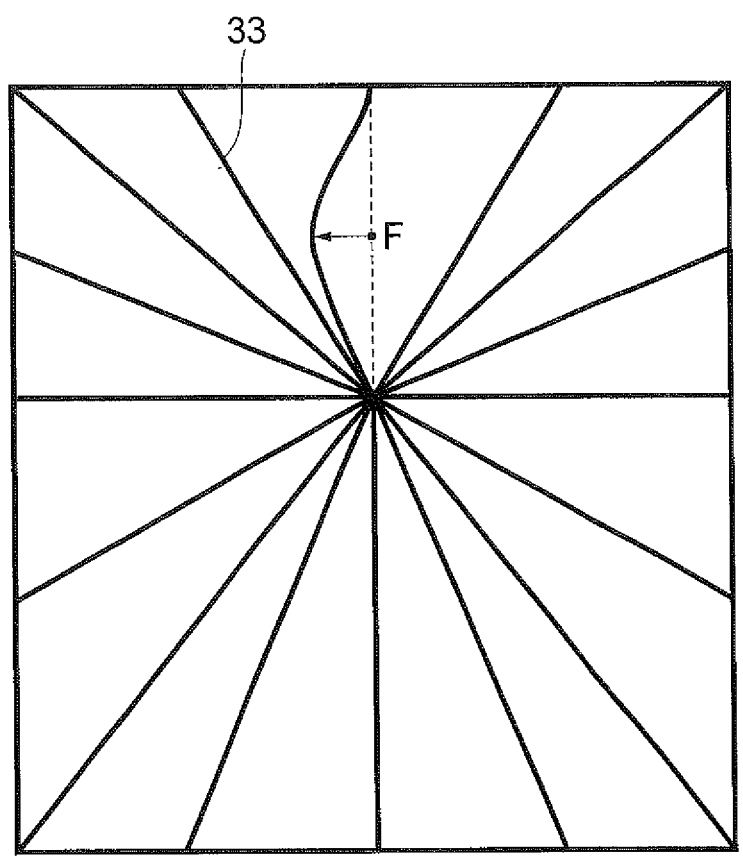
FIG. 9 is a diagram illustrating a simulation result when a force is input to an arbitrary position of the first string portion.
Figure 10:
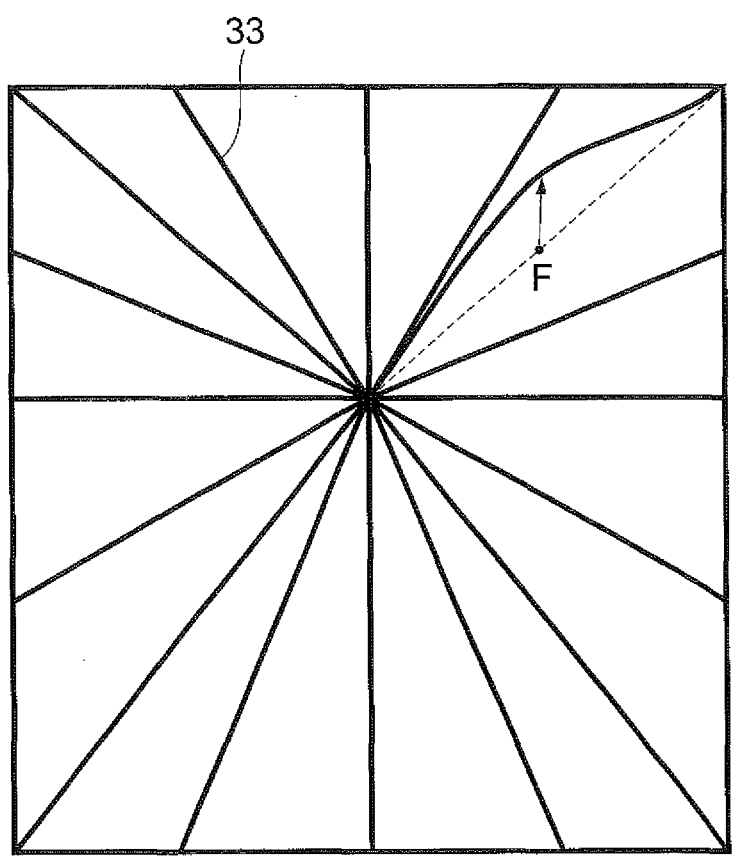
FIG. 10 is a diagram illustrating a simulation result when a force is input to an arbitrary position of the first string portion.
Figure 11:
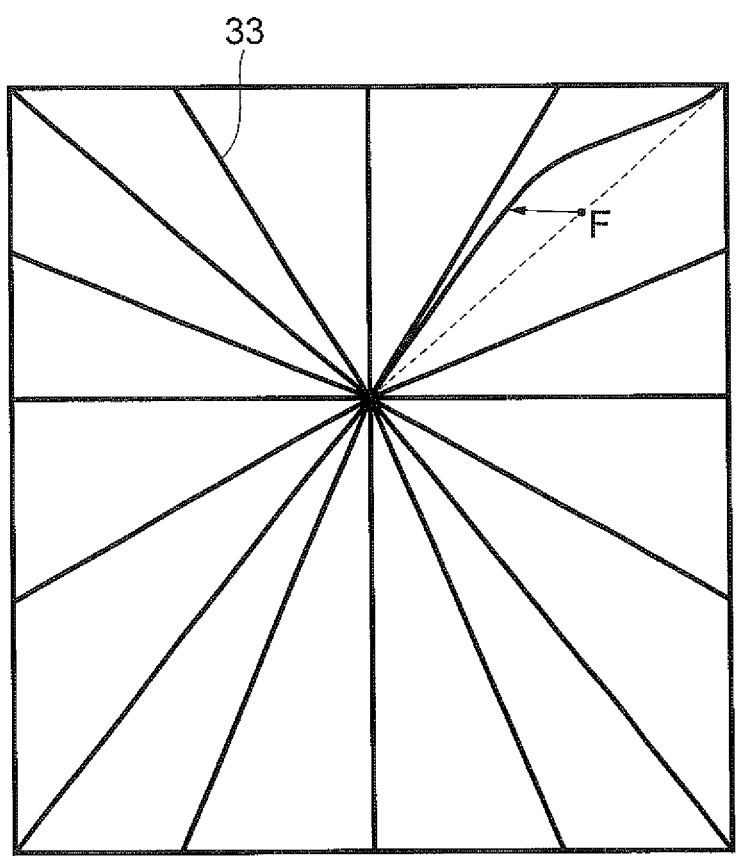
FIG. 11 is a diagram illustrating a simulation result when a force is input to an arbitrary position of the first string portion.
Figure 12:
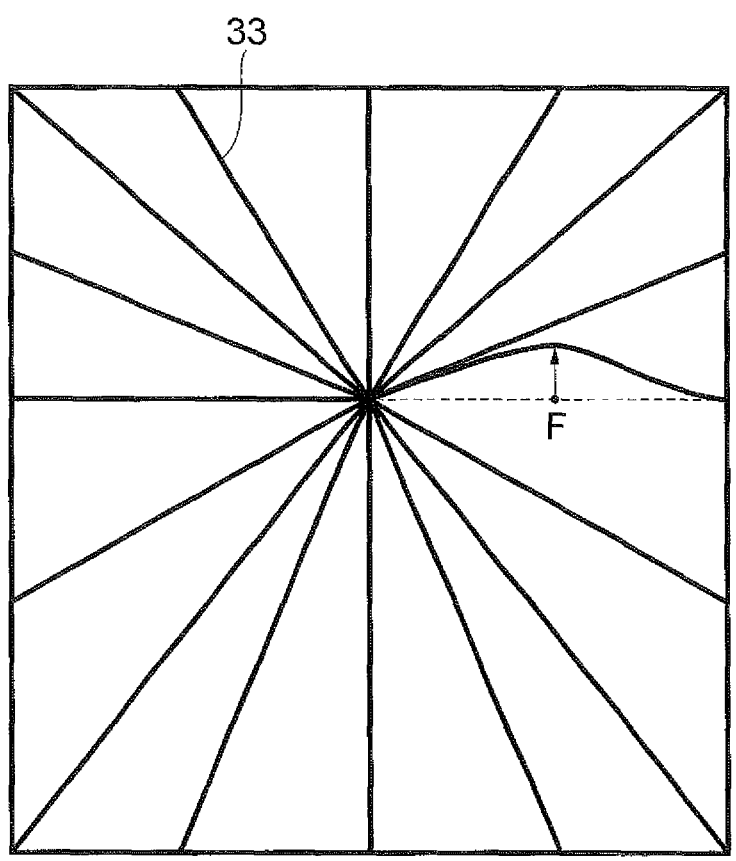
FIG. 12 is a diagram illustrating a simulation result when a force is input to an arbitrary position of the first string portion.

A property of the first string portion 33 will be described with reference to FIGS. 7 and 8. FIG. 7 is a view for illustrating rigidity in a case where the first string portion is a linear member having a circular section. FIG. 8 is a view for illustrating stress applied to the first string portion. FIG. 8(a) illustrates a case where a force in an axial direction is input, and FIG. 8(b) illustrates a case where a force in a bending direction is input, respectively. As illustrated in FIGS. 7 and 8, the first string portion 33 is configured so that a section radius r is short and a length L is long. For this reason, the first string portion has a property that the rigidity in the axial direction (direction of tensile strength) is high, and the rigidity in the bending direction is low. Here, a case where a force P in the axial direction is input to the first string portion 33 which is the linear member having the circular section and a case where a force F in the bending direction is input to the first string portion 33 which is the linear member having the circular section may be considered. In these cases, the rigidity of the first string portion 33 in the axial direction is expressed by the following Equation (1), and the rigidity of the first string portion 33 in the bending direction is expressed by the following Equation (2). Signs $\sigma$, L, r, E, and I respectively represent the stress, length, section radius, elastic modulus, and geometrical moment of inertia.

$$\text{AXIAL RIGIDITY: } \frac{P}{\sigma} = \frac{\pi r^2 E}{L} \quad (1)$$

-continued $$BENDIBG\ \text{RIGIDITY:}\ \frac{F}{\sigma} = \frac{48IE}{L^3} = \frac{12\pi r^4 E}{L^3} \quad (2)$$

As expressed in Equation (1) and Equation (2), the rigidity in the bending direction is proportional to the square of the section radius, and the rigidity in the axial direction is proportional to the fourth power of the section radius. Therefore, as illustrated in FIG. 2, the net 32 is configured to have high rigidity in a radial direction around the connection member 34 which is the axial direction of the respective first string portions 33 (translational direction of the respective first string portions 33). In addition, the net 32 is configured to have low rigidity in a pivotal movement direction around the connection member 34 which is a direction perpendicular to the respective first string portions 33. In FIG. 2, Arrow A represents a direction of low rigidity, and Arrow B represents a direction of high rigidity.

FIGS. 9 to 12 are views illustrating results in which in a model of the seat backrest 3 including the net 32 configured to have 16 first string portions 33, a displacement state of the net 32 when the force F in the bending direction is input to the first string portions 33 is simulated by using the finite element method. As illustrated in FIGS. 9 to 12, even when the force F is input to any one of the first string portions 33, or even when the force F is input in various directions, the first string portions 33 are displaced in the pivotal movement direction around the connection member 34. That is, the net 32 enables the scapula of the vehicle occupant which comes into contact with the first string portion 33 at a position offset from the connection member 34 to be displaced in the pivotal movement direction around the connection member 34.

As described above, according to the vehicle seat 1 in the present embodiment, the net 32 having the first string portions 33 is disposed to stretch in the seat backrest frame 31 formed in the frame shape. Accordingly, the vehicle occupant C sitting on the vehicle seat 1 leans against the first string portions 33 configuring the net 32. Then, the first string portions 33 configuring the net 32 are arranged radially. Accordingly, the vehicle occupant C sitting on the vehicle seat can pivotally move his or her upper body around the connection member 34. As a result, when the vehicle occupant C (driver) sitting on the vehicle seat 1 serving as the driver's seat performs a steering operation, the vehicle occupant C can pivotally move his or her upper body in the roll direction of the vehicle, and thus can adopt a posture which enables the vehicle occupant C to perform a comfortable steering operation. In addition, the vehicle occupant C sitting on the vehicle seat which is the driver's seat or the seat other than the driver's seat is deviated outward in the turning direction due to lateral acceleration applied thereto at the time of turning. However, the scapula of the vehicle occupant which comes into contact with the first string portion 33 at a position offset from the connection member 34 is displaced in the pivotal movement direction around the connection member 34. Accordingly, the head of the vehicle occupant C is moved less. Moreover, the vehicle occupant C can adopt a posture excellent in posture maintaining capability at the time of turning by pivotally moving the scapula in the pivotal movement direction around the connection member 34. In this manner, the steering operability is improved in the driver's seat, and the posture maintaining capability at the time of turning is improved in the driver's seat and the seat other than the driver's seat.

In addition, the connection member 34 is arranged at a position higher than the vertical center C1 of the seat backrest frame 31. Accordingly, the vehicle occupant C sitting on the vehicle seat 1 can pivotally move his or her upper body around the vicinity of the scapula while leaning against the first string portions 33 configuring the net 32. As a result, when the vehicle occupant C (driver) sitting on the vehicle seat 1 serving as the driver's seat performs a steering operation, the vehicle occupant C can pivotally move his or her upper body around the vicinity of the scapula in the roll direction of the vehicle, and thus can adopt a posture which enables the vehicle occupant C to perform the comfortable steering operation. In addition, the vehicle occupant C sitting on the vehicle seat 1 which is the driver's seat or the seat other than the driver's seat can adopt a posture excellent in posture maintaining capability at the time of turning with the head being moved less by pivotally moving his or her upper body around the vicinity of the scapula in the roll direction.

In addition, when the connection member 34 is arranged at the horizontal center C2 of the seat backrest frame 31, the connection member 34 can oppose a portion between the scapulae on the right and the left sides. This enables the vehicle occupant C sitting on the vehicle seat 1 to move his or her upper body pivotally and more smoothly.

Second Embodiment

Next, a second embodiment will be described. The second embodiment is basically the same as the first embodiment, but is different from the first embodiment in that the net is configured to have the first string portion and the second string portion. Therefore, in the following description, points different from those in the first embodiment will be described, and thus the same description as that in the first embodiment will be omitted.

Figure 13:
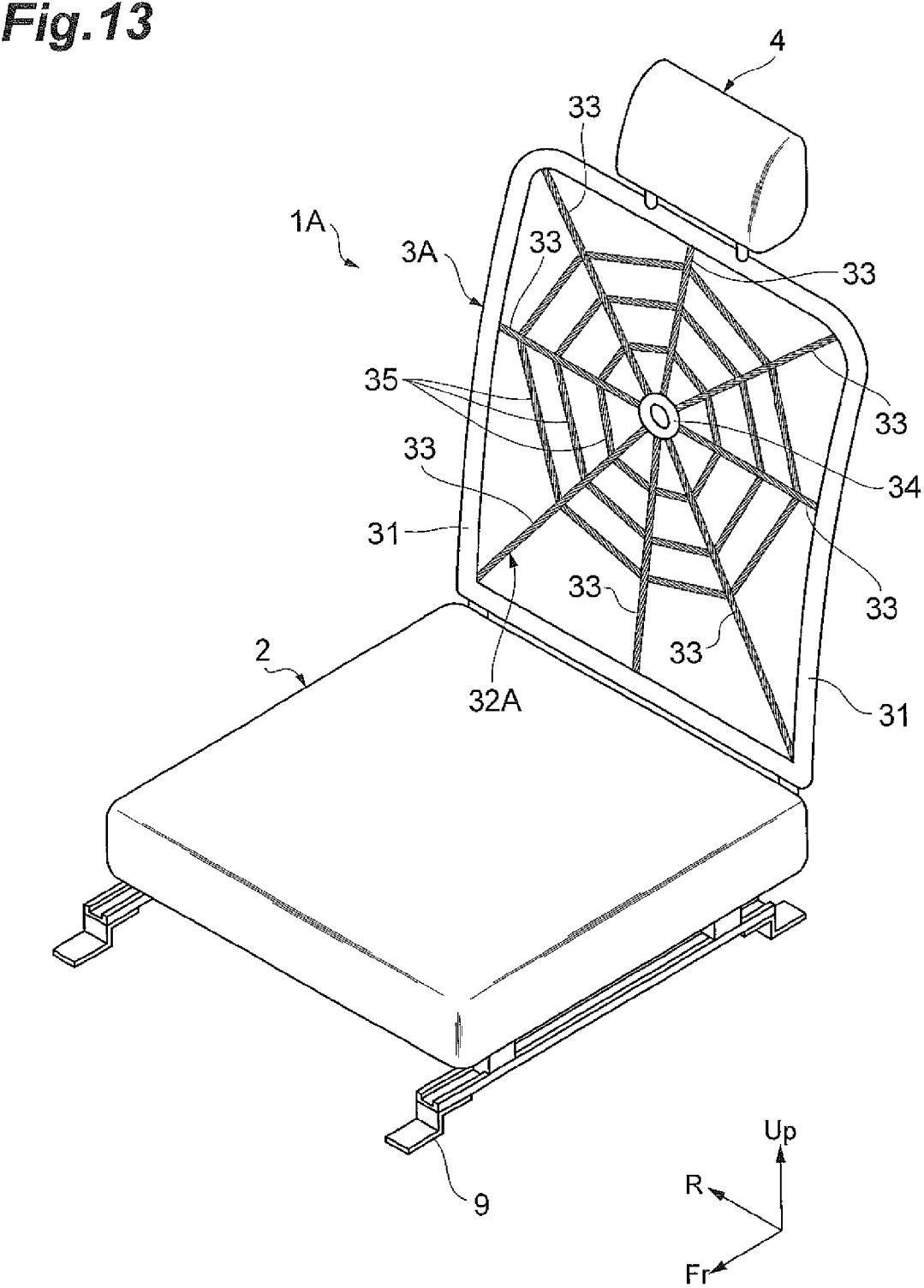
FIG. 13 is a perspective view illustrating a vehicle seat according to a second embodiment.

FIG. 13 is a side view illustrating a vehicle seat according to the second embodiment. As illustrated in FIG. 13, a vehicle seat 1A according to the second embodiment includes the seat 2 the same as that in the first embodiment, a seat backrest 3A corresponding to the seat backrest 3 in the first embodiment, and the headrest 4 the same as that in the first embodiment.

Figure 14:
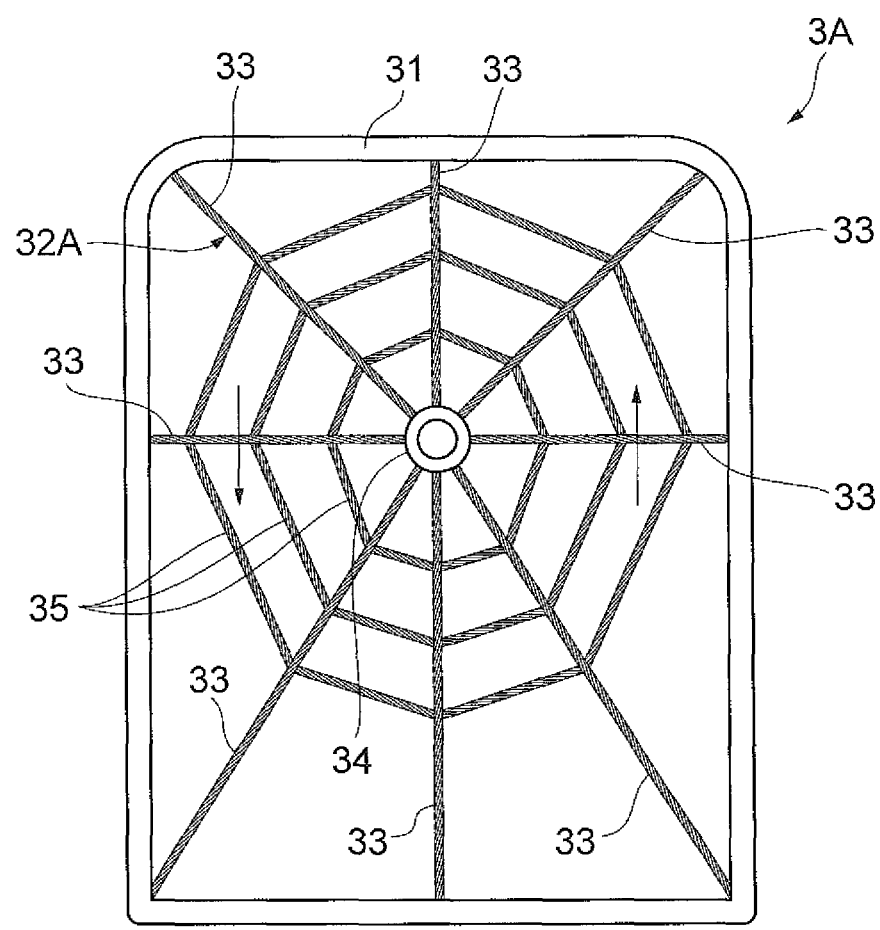
FIG. 14 is a front view of a seat backrest.

FIG. 14 is a front view of the seat backrest. As illustrated in FIGS. 13 and 14, the seat backrest 3A includes the seat backrest frame 31 the same as that in the first embodiment, and a net 32A corresponding to the net 32 in the first embodiment.

Figure 15:
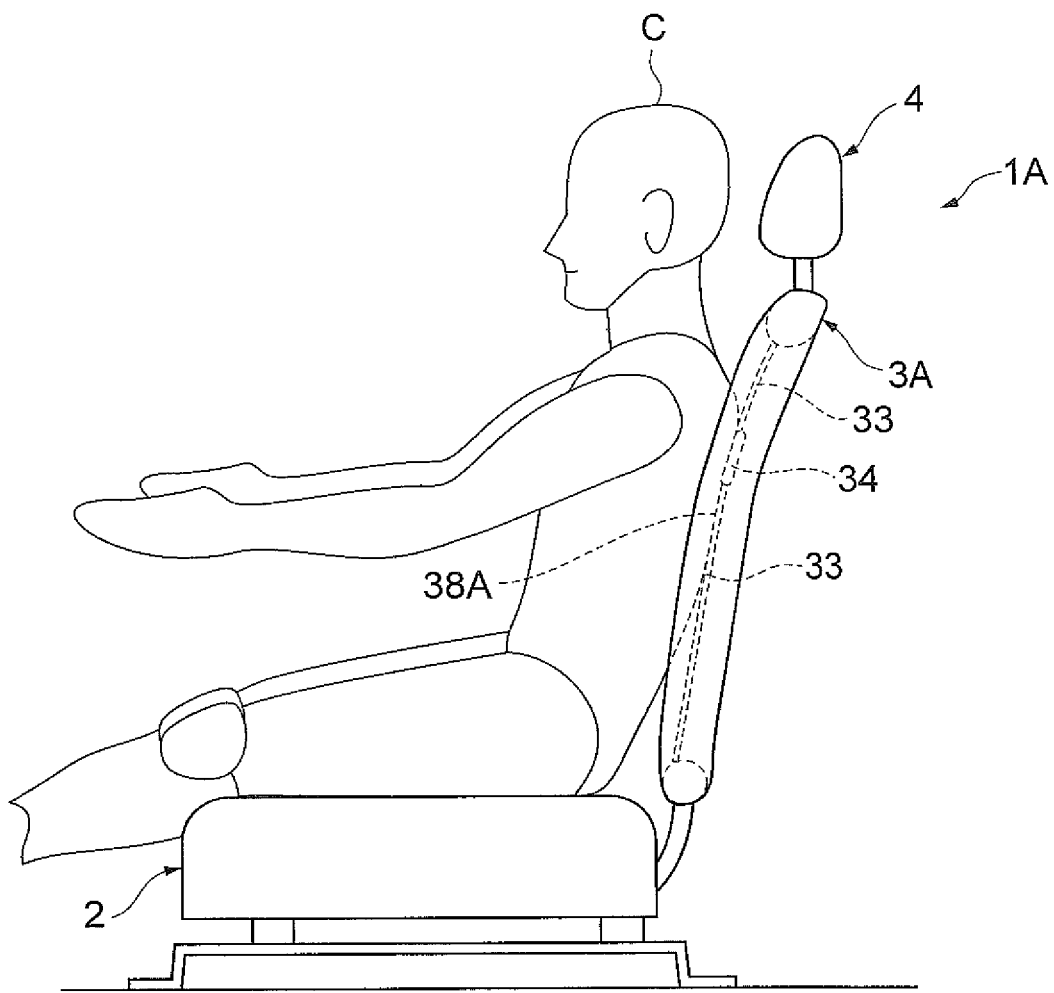
FIG. 15 is a side view illustrating a state where a vehicle occupant sits on the vehicle seat.

FIG. 15 is a side view illustrating a state where the vehicle occupant sits on the vehicle seat. As illustrated in FIGS. 13 to 15, the net 32A is formed in a web shape (cobweb), and has a backrest surface 38A with which the back of a vehicle occupant comes into contact when the vehicle occupant sitting on the vehicle seat 1 leans against the seat backrest. Then, the net 32A has the first string portions 33 the same as those in the first embodiment, and one or more second string portions 35 which are connected to the plurality of first string portions 33. The first string portions 33 and the second string portions 35 are arranged in a web shape within the backrest surface 38A of the seat backrest 3A. The second string portions 35 are configured to have an elongated member. The property, material, shape, size, length, and the number can be set appropriately. In addition, the second string portions 35 may be appropriately covered with a cover.

The second string portions 35 are arranged in an annular shape surrounding the connection member 34, and are all connected to the first string portions 33. When the plurality of second string portions 35 are provided, the respective second string portions 35 are arranged so as not to overlap each other. To be more specific, the second string portions 35 are connected to all the adjacent first string portions 33 configuring the net 32. In addition, the second string portion 35 is formed in a polygonal shape whose apex point is a point connected to the first string portion 33. Then, the second string portion 35 can be connected to the first string portion 33 so as to be substantially linear between the first string portions 33 adjacent to each other. The meaning of substantially linear includes not only linear but also a state regarded as substantially linear. In this case, the second string portion 35 can be brought into a stretched state so that tensile strength acts thereon.

In the present embodiment, a case will be described where the second string portions 35 are arranged in an annular shape surrounding the connection member 34 and are connected to all the first string portions 33. However, the second string portions 35 may not necessarily be arranged in the annular shape surrounding the connection member 34, or may not be connected to all the first string portions 33. In this case, for example, the second string portions 35 can be connected to only the plurality of first string portions 33 which are a part of all the first string portions 33 configuring the net 32A. In addition, the second string portion 35 may be continuously connected to the first string portion 33 adjacent thereto, or may be connected to the first string portion 33 by skipping one or more first string portions 33.

A method of connecting the second string portion 35 to the first string portion 33 is not particularly limited as long as the second string portion 35 can be firmly connected to the first string portion 33 without being deviated therefrom. For example, the first string portion 33 and the second string portion 35 may be connected by being fastened to each other. In addition, the first string portion 33 and the second string portion 35 may be connected to each other by using an adhesive. In addition, the first string portion 33 and the second string portion 35 may be connected to each other by using a fastening member such as a rivet.

Figure 16:
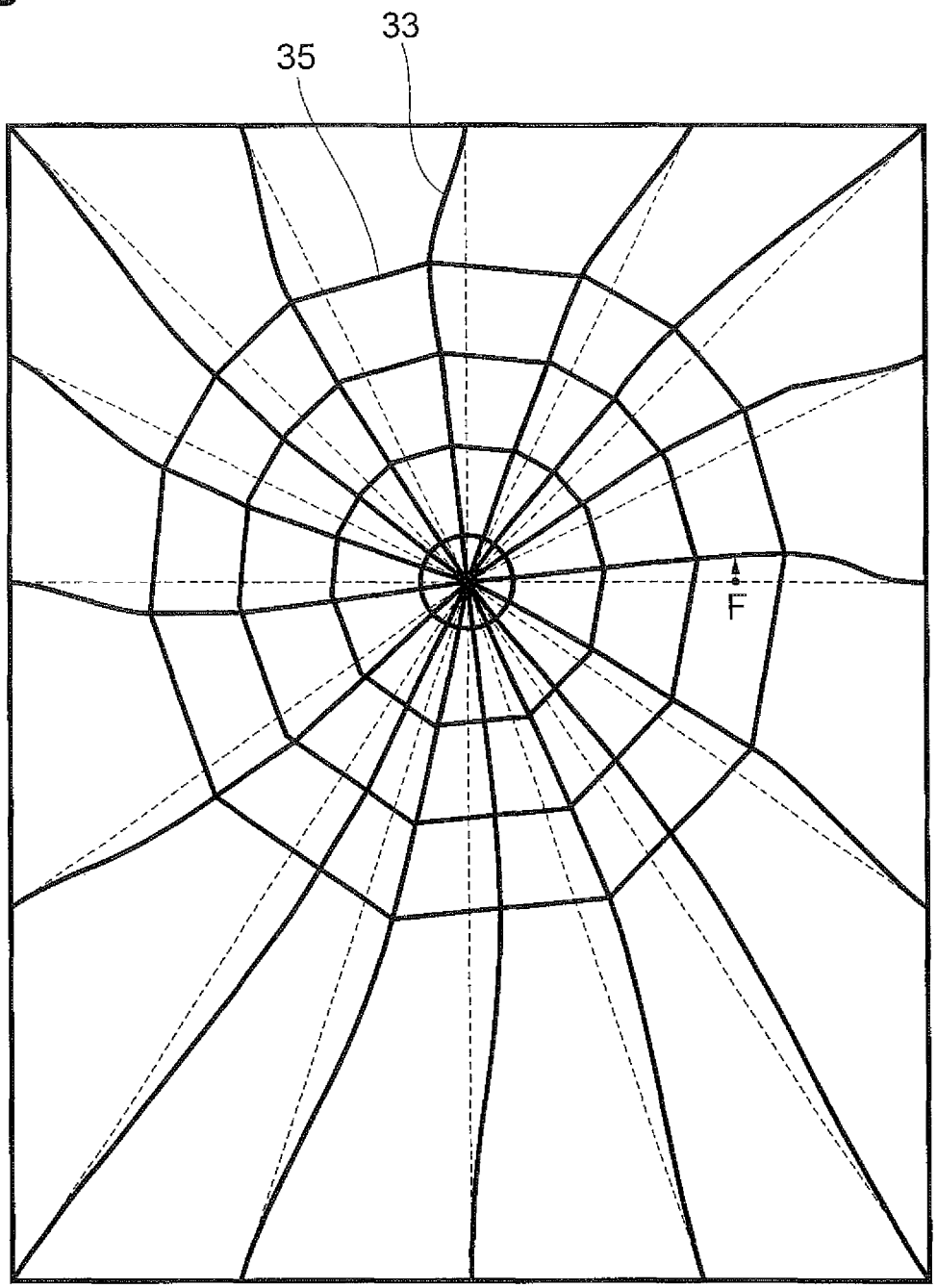
FIG. 16 is a diagram illustrating a simulation result when a force is input to an arbitrary position of a first string portion.

FIG. 16 is a view illustrating a result in which in a model of the seat backrest 3A including the net 32 configured to have 16 first string portions 33 and three second string portions 35, a displacement state of the net 32A when the force F in the bending direction is input to the first string portions 33 is simulated by using the finite element method. As illustrated in FIG. 16, if the force F is input to one of the first string portions 33, the first string portion 33 is displaced in the pivotal movement direction around the connection member 34. Then, the rigidity of the second string portion 35 in the axial direction causes the displacement to be transferred to all the other first string portions 33, and all the first string portions 33 are displaced in the same pivotal movement direction around the connection member 34. That is, if a portion on the right side from the connection member 34 is displaced upward, a portion on the left side from the connection member 34 is displaced downward. In contrast, if the portion on the right side from the connection member 34 is displaced downward, the portion on the left side from the connection member 34 is displaced upward. In this manner, when the scapula on one side is moved vertically, the scapula on the opposite side is moved in a direction opposite thereto.

As described above, according to the vehicle seat 1A in the present embodiment, the plurality of first string portions 33 are connected to one or more second string portions 35. Accordingly, if any one of the first string portions 33 is pivotally moved and displaced around the connection member 34, the pivotally moved displacement is transferred to the other first string portion 33 through the second string portion 35, and the other first string portion 33 is also pivotally moved and displaced around the connection member 34. In this manner, the scapula on the right side and the scapula on the left side can be moved in directions opposite to each other around the connection member 34. Therefore, the upper body can be pivotally moved more smoothly.

In addition, the displacement of the first string portion 33 can be transferred to the overall net 32A by arranging the second string portions 35 in the annular shape surrounding the connection member 34. Therefore, the upper body can be pivotally moved more smoothly.

Third Embodiment

Next, a third embodiment will be described. The third embodiment is basically the same as the first embodiment, but is different from the first embodiment in that the seat is configured to be pivotally movable. Therefore, in the following description, points different from those in the first embodiment will be described, and thus description the same as that in the first embodiment will be omitted.

Figure 17:
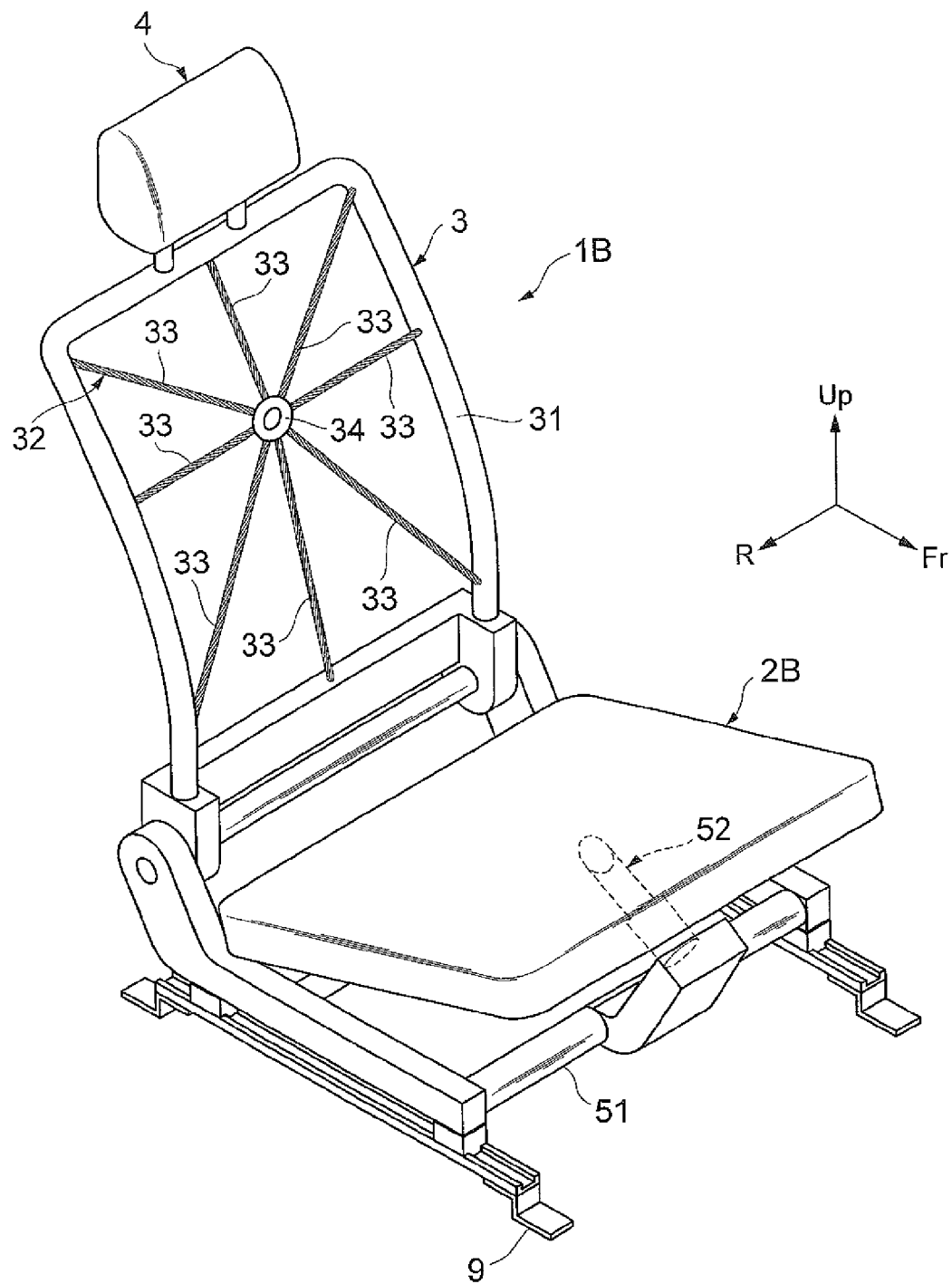
FIG. 17 is a perspective view illustrating a vehicle seat according to a third embodiment.
Figure 18:
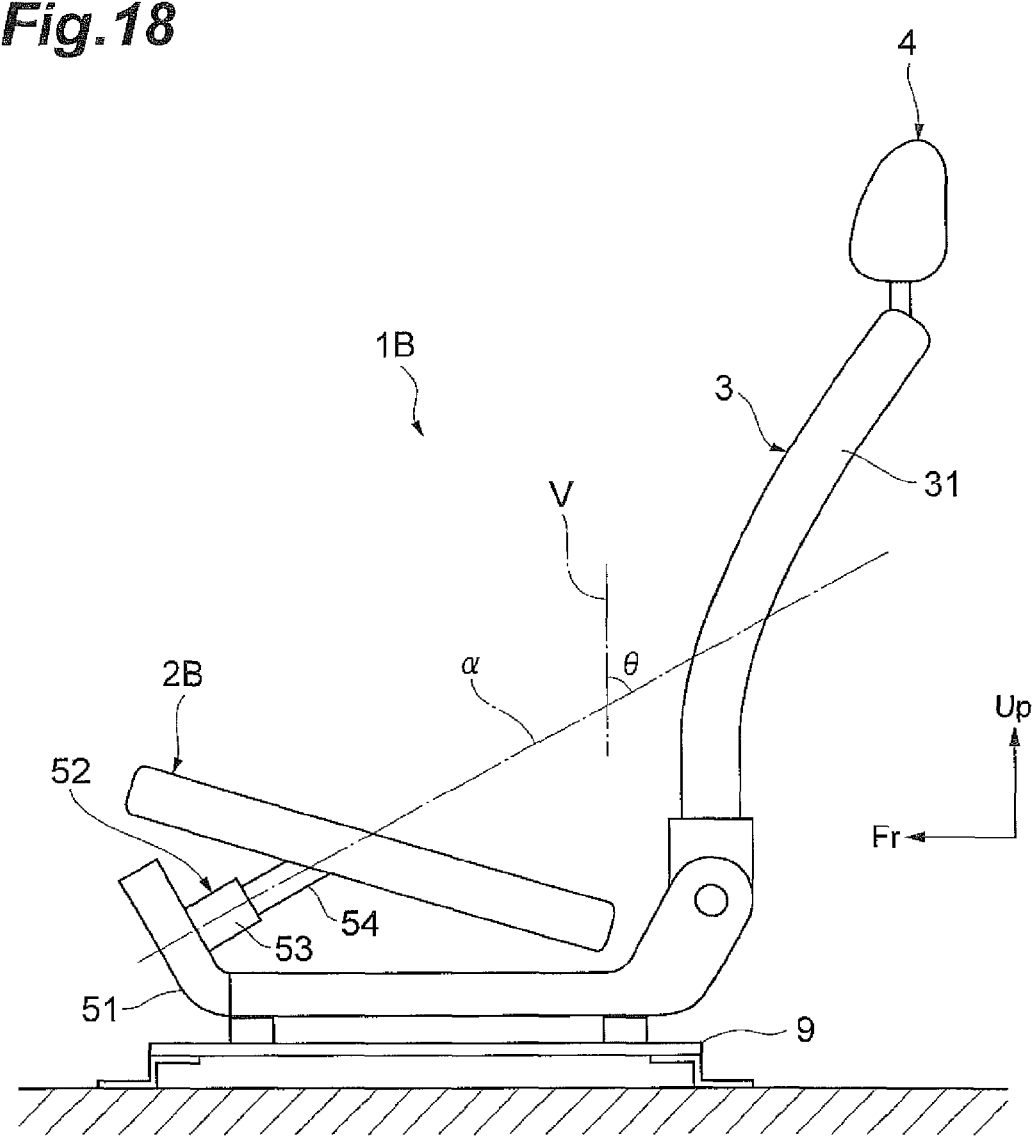
FIG. 18 is a side view illustrating the vehicle seat according to the third embodiment.
Figure 19:
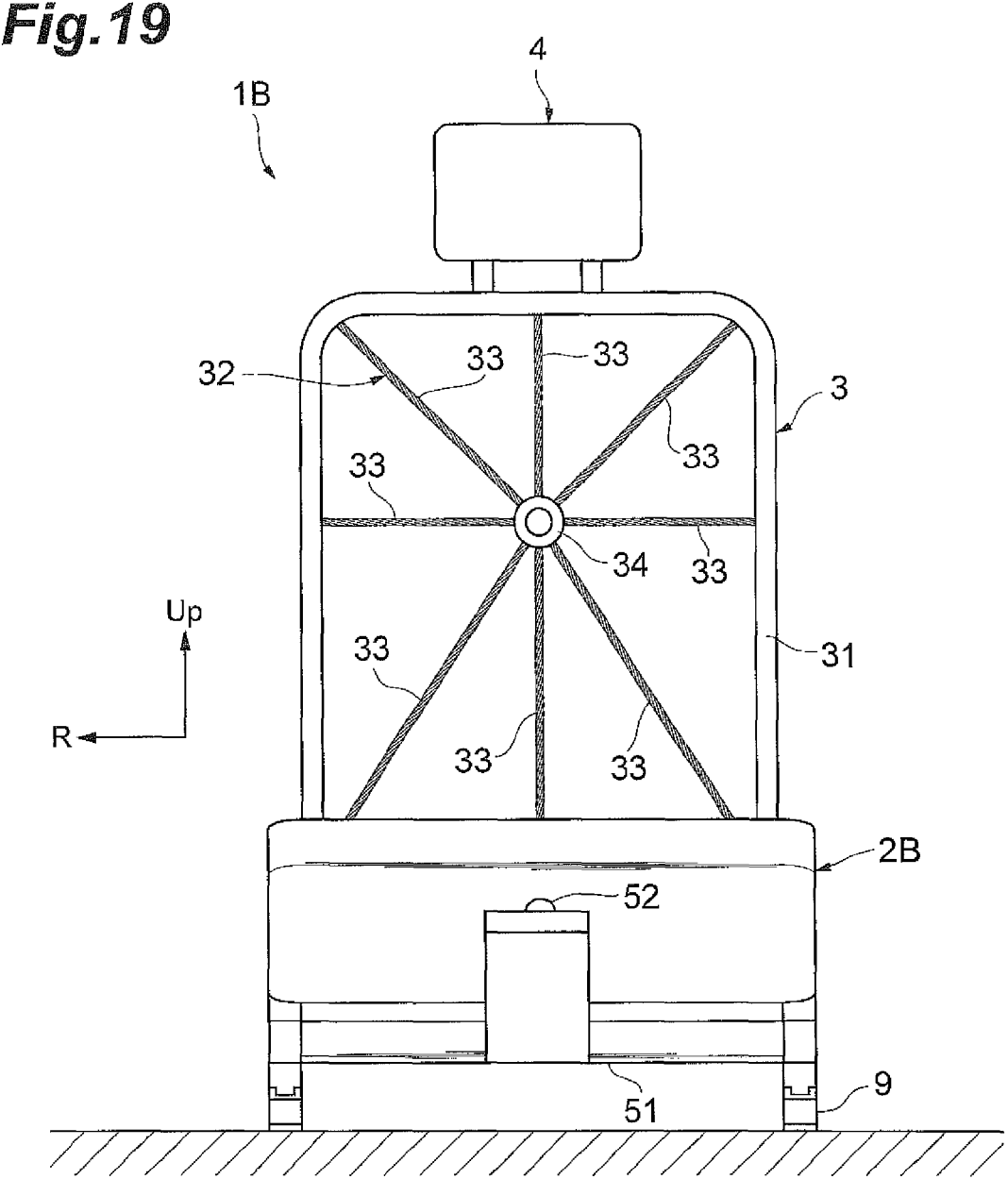
FIG. 19 is a front view illustrating the vehicle seat according to the third embodiment.

FIG. 17 is a perspective view illustrating a vehicle seat according to the third embodiment. FIG. 18 is a side view illustrating the vehicle seat according to the third embodiment. FIG. 19 is a front view illustrating the vehicle seat according to the third embodiment. As illustrated in FIGS. 17 to 19, a vehicle seat 1B according to the third embodiment includes a seat 2B in place of the seat 2 in the first embodiment, the seat backrest 3 the same as that in the first embodiment, and the headrest 4 the same as that in the first embodiment.

A seat frame 51 for supporting the seat 2B is slidably attached to the rail 9 fixed onto the floor of the vehicle, and a seat support mechanism 52 which pivotally supports the seat 2B so as to be pivotally movable is attached to the seat frame 51.

In order to pivotally support the seat 2B so as to be pivotally movable, the seat support mechanism 52 includes a thrust bearing 53 fixed to the seat frame 51, and a thrust shaft 54 which is fixed to the seat 2B and is connected to the thrust bearing 53 so as to be pivotally movable. Therefore, the pivot axis α of the seat 2B which is formed by the seat support mechanism 52 coincides with the pivot axis α of the thrust shaft 54.

Figure 20:
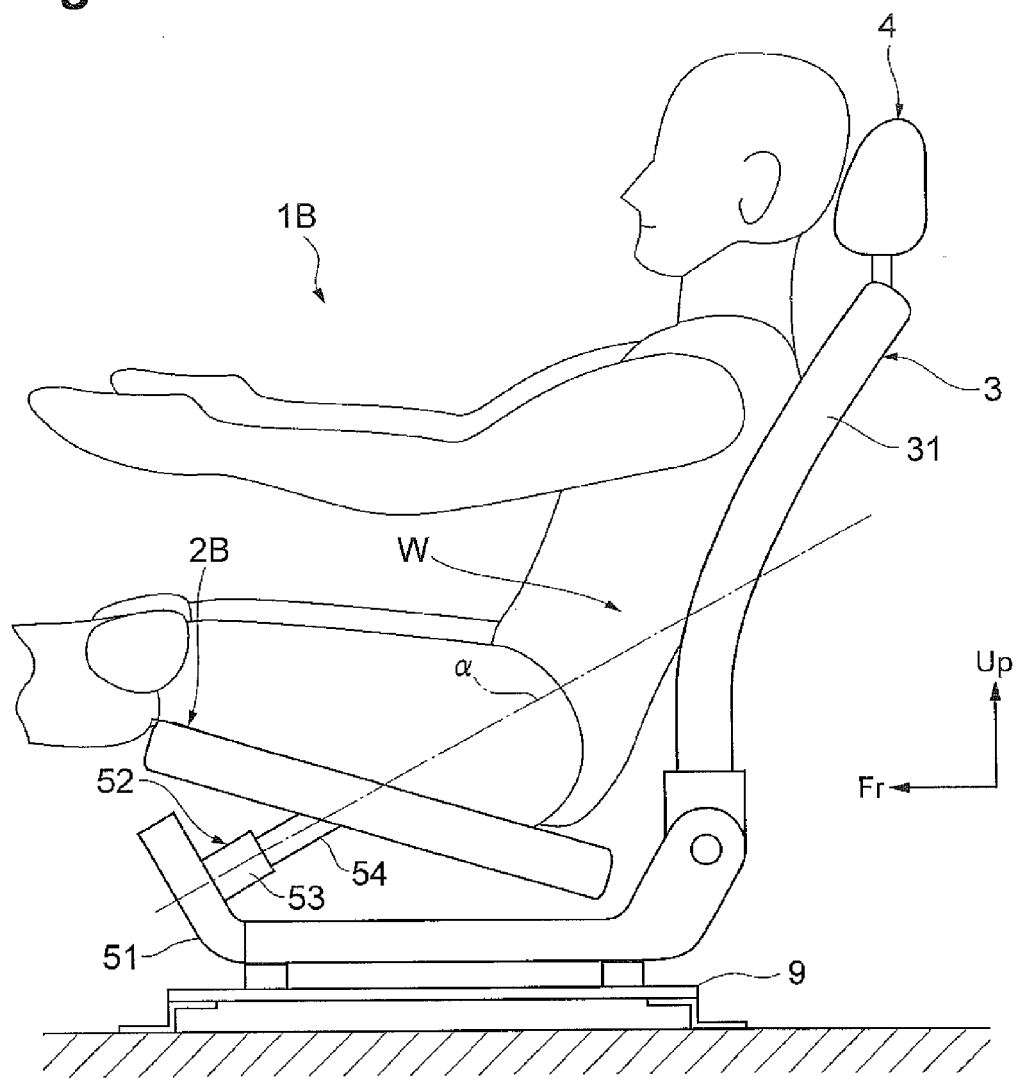
FIG. 20 is a side view illustrating a state where a vehicle occupant sits on the vehicle seat.

FIG. 20 is a side view illustrating a state where the vehicle occupant sits on the vehicle seat. As illustrated in FIG. 20, the pivot axis α extends in the longitudinal direction of the vehicle seat 1B. The pivot axis α is set so that a front section thereof is configured to be higher than a rear section in the longitudinal direction of the vehicle seat 1B, and so as to pass the vicinity of the waist W of the vehicle occupant sitting on the seat 2B. Therefore, the seat 2B and the pelvis of the vehicle occupant which is placed on the seat 2B can be pivotally moved around the pivot axis α in the roll direction and the yaw direction of the vehicle. The waist represents a part of the body including the lumbar spine or trunk muscles around the lumbar spine, and the vicinity of the waist represents the waist and a part around the waist.

Figure 21:
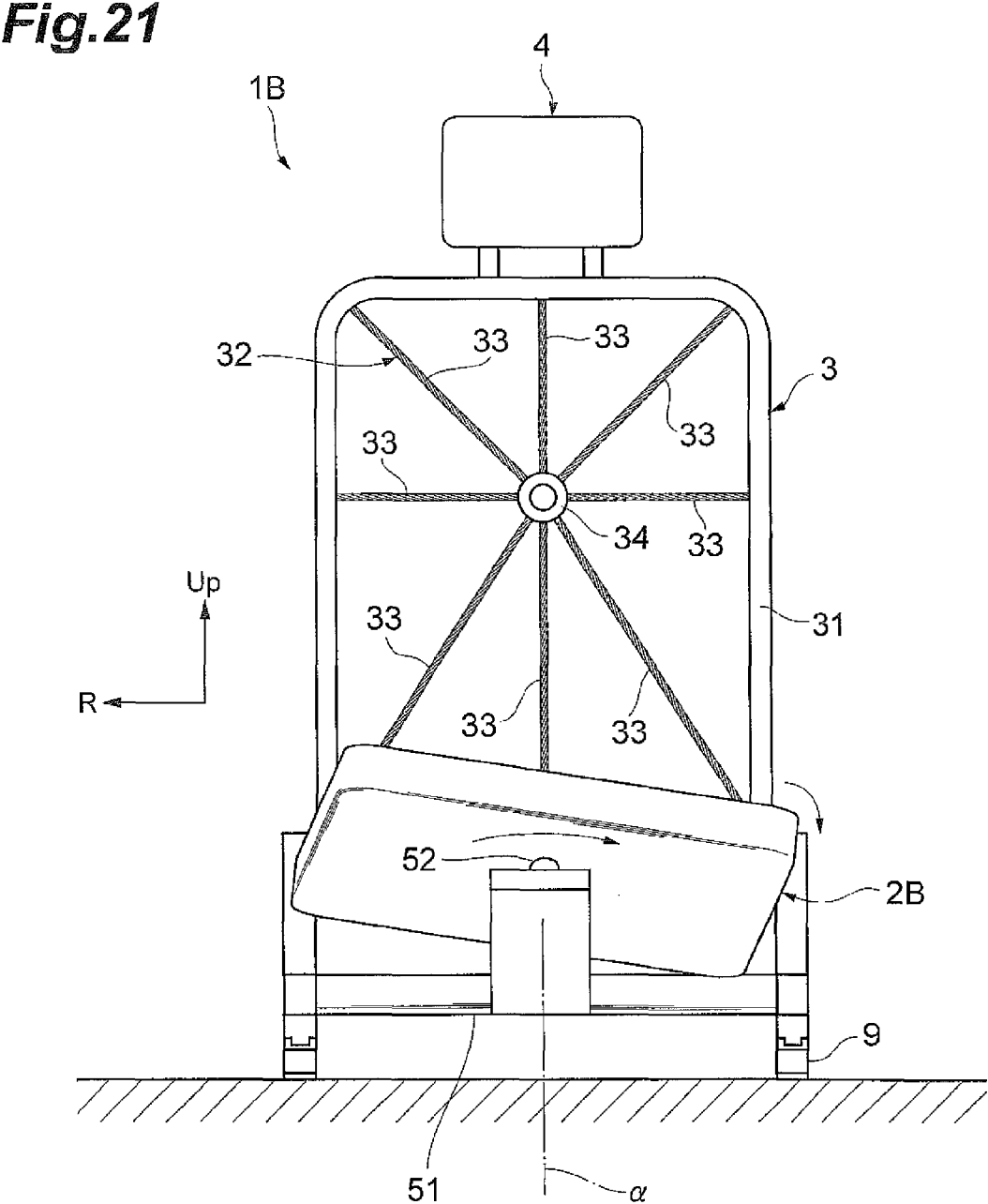
FIG. 21 is a front view illustrating the vehicle seat in which a seat is pivotally moved in a clockwise direction around a pivot axis of a seat support mechanism in a front view.

FIG. 21 is a front view illustrating the vehicle seat in which the seat is pivotally moved in a clockwise direction around the pivot axis of the seat support mechanism in a front view. As illustrated in FIG. 21, if the seat 2B is pivotally moved in the clockwise direction (clockwise) around the pivot axis α in the front view of the vehicle seat 1B, the seat 2B is pivotally moved around the pivot axis α in the roll direction and the yaw direction of the vehicle, thereby adopting the following posture.

That is, the seat 2B is pivotally moved around the pivot axis α in the roll direction of the vehicle, thereby adopting a posture in which the right side of the seat 2B is moved relatively upward in the vertical direction of the vehicle seat 1B as compared to the left side of the seat 2B. This causes the vehicle occupant sitting on the seat 2B to adopt a posture in which the pelvis is pivotally moved around the pivot axis α in the roll direction of the vehicle so that the right side of the pelvis is moved relatively upward in the vertical direction of the vehicle occupant as compared to the left side of the pelvis.

In addition, the seat 2B is pivotally moved around the pivot axis α in the yaw direction of the vehicle, thereby adopting a posture in which the right side of the seat 2B is moved relatively forward in the longitudinal direction of the vehicle seat 1B as compared to the left side of the seat 2B. This causes the vehicle occupant sitting on the seat 2B to adopt a posture in which the pelvis is pivotally moved around the pivot axis α in the yaw direction of the vehicle so that the right side of the pelvis is moved relatively forward in the longitudinal direction of the vehicle occupant as compared to the left side of the pelvis.

Figure 22:
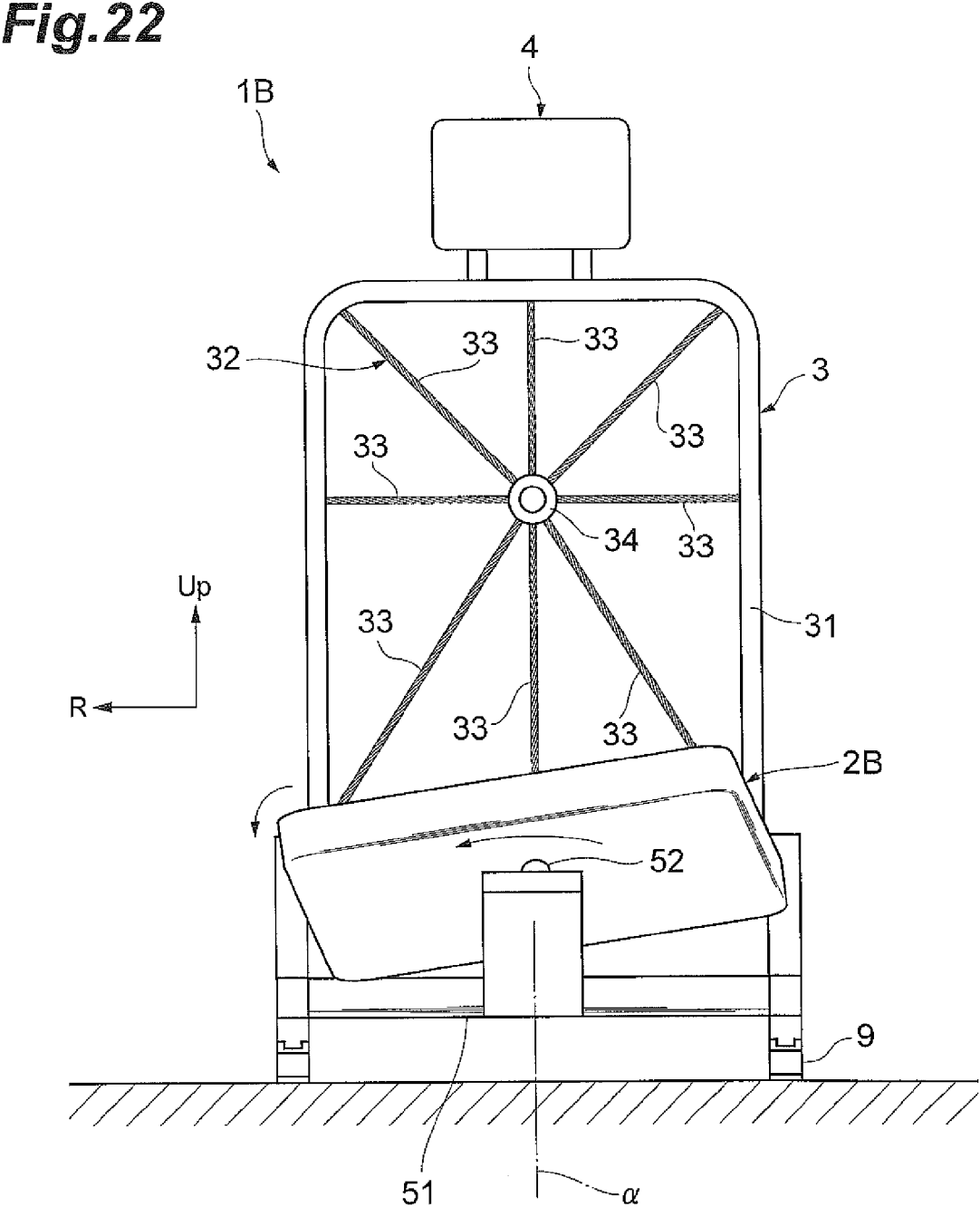
FIG. 22 is a front view illustrating the vehicle seat in which the seat is pivotally moved in a counterclockwise direction around the pivot axis of the seat support mechanism in a front view.

FIG. 22 is a front view illustrating the vehicle seat in which the seat is pivotally moved in a counterclockwise direction around the pivot axis of the seat support mechanism in a front view. As illustrated in FIG. 22, if the seat 2B is pivotally moved in the counterclockwise direction (counterclockwise) around the pivot axis α in the front view of the vehicle seat 1B, the seat 2B is pivotally moved around the pivot axis α in the roll direction and the yaw direction of the vehicle, thereby adopting the following posture.

That is, the seat 2B is pivotally moved around the pivot axis α in the roll direction of the vehicle, thereby adopting a posture in which the left side of the seat 2B is moved relatively upward in the vertical direction of the vehicle seat 1B as compared to the right side of the seat 2B. This causes the vehicle occupant sitting on the seat 2B to adopt a posture in which the pelvis is pivotally moved around the pivot axis α in the roll direction of the vehicle so that the left side of the pelvis is moved relatively upward in the vertical direction of the vehicle occupant as compared to the right side of the pelvis.

In addition, the seat 2B is pivotally moved around the pivot axis α in the yaw direction of the vehicle, thereby adopting a posture in which the left side of the seat 2B is moved relatively forward in the longitudinal direction of the vehicle seat 1B as compared to the right side of the seat 2B. This causes the vehicle occupant sitting on the seat 2B to adopt a posture in which the pelvis is pivotally moved around the pivot axis α in the yaw direction of the vehicle so that the left side of the pelvis is moved relatively forward in the longitudinal direction of the vehicle occupant as compared to the right side of the pelvis.

Figure 23:
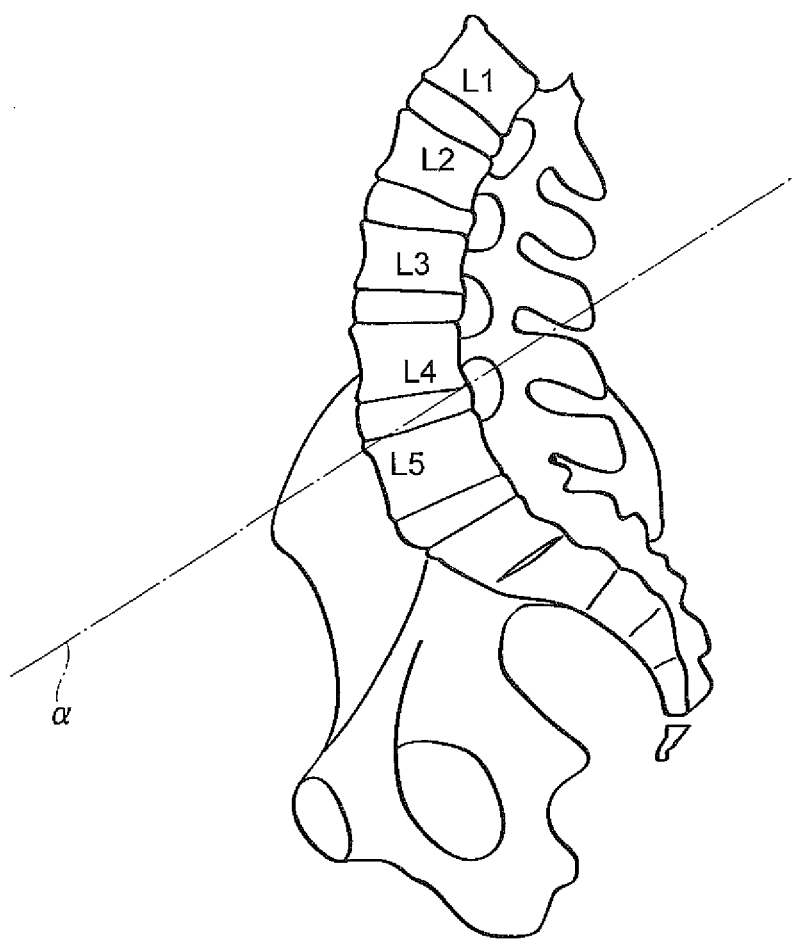
FIG. 23 is a view for illustrating a relationship between the pivot axis of the seat and the lumbar spine.

Here, a setting angle of the pivot axis α of the seat 2B will be described with reference to FIGS. 18 and 23. FIG. 23 is a view for illustrating a relationship between the pivot axis of the seat and the lumbar spine. The spine is configured to have multiple vertebrae connected to one another via intervertebral disks, and is curved into an S-shape in a side view. As illustrated in FIG. 23, the lumbar spine configuring a part of the spine is configured to have five vertebrae connected to an upper portion of the sacrum of the pelvis (referred to as the "sacrum"), and extends upward while tilting rearward from the sacrum of the pelvis. The vertebrae configuring the lumbar spine are respectively referred to as L1 to L5 from above. Then, the intervertebral disks connecting the respective vertebrae configuring the lumbar spine enable the lumbar spine to be bent or twisted. Therefore, if in a motion for twisting the lumbar spine, an axis which passes through the intervertebral disks and is orthogonal to the surface of the intervertebral disks serves as the pivot axis, the motion becomes the most comfortable.

As illustrated in FIG. 18, in a posture where the vehicle occupant sits on the vehicle seat 1B, the axis orthogonal to the surface of the intervertebral disks of the lumbar spine falls within a range in which a tilting angle θ with respect to a vertical line V is approximately 45°. However, if the tilting angle of the pivot axis α with respect to the vertical line V is small, the foot of the vehicle occupant is far away from the pivot axis α. Consequently, the pivotal movement of the seat 2B causes the foot of the vehicle occupant (particularly, the knee) to flap unstably. Therefore, if the tilting angle of the pivot axis α with respect to the vertical line V is increased and the variation (pivotal movement) in the seat 2B and the pelvis is increased in the roll direction further than the yaw direction, the steering operation can be easily performed, and a posture at the time of turning can be comfortably maintained.

Therefore, it is preferable to set the tilting angle θ of the pivot axis α with respect to the vertical line V to fall within a range of 60°±15° with respect to the vertical line V. That is, the tilting angle θ can be set to fall within a range of 45° to 75°. In this case, the tilting angle θ may be set to fall within a range of 50° to 70°, or to fall within a range of 55° to 65°.

Furthermore, in a viewpoint of comfortable twisting of the lumbar spine, for example, as illustrated in FIG. 23, it is possible to set the pivot axis α to pass through the vertebra of L4 or L5 which configures the lumbar spine.

Incidentally, in order to pivotally move the steering wheel, the vehicle occupant performing the steering operation moves the inner shoulder in the turning direction relatively downward in the vertical direction of the vehicle seat 1B as compared to the outer shoulder in the turning direction, and moves the inner shoulder in the turning direction relatively rearward in the longitudinal direction of the vehicle seat 1B as compared to the outer shoulder in the turning direction. At this time, in view of the law of conservation of angular momentum between the pelvis and the shoulder, the lumbar spine is bent so as to further shorten the distance between the inner pelvis and shoulder in the vehicle turning direction as compared to the distance between the outer pelvis and shoulder in the vehicle turning direction, and the lumbar spine is twisted so as to pivotally move the pelvis and the shoulder in the directions opposite to each other. In this manner, the steering operation can be comfortably performed. This is a natural motion empirically learned by a person since the person's movement originates from the waist.

In this regard, according to the vehicle seat 1B in the present embodiment, the seat 2B is configured to be pivotally movable, and the pivot axis α of the seat 2B extends in the longitudinal direction of the vehicle seat 1B, and passes the vicinity of the waist W of the vehicle occupant sitting on the seat 2B. Accordingly, the vehicle occupant can pivotally move his or her upper body around the vicinity of the scapula while twisting the lumbar spine and pivotally moving the pelvis. This enables the vehicle occupant to adopt a posture which can comfortably perform the steering operation, or a posture excellent in posture maintaining capability at the time of turning. Therefore, the steering operability and the posture maintaining capability of the vehicle occupant at the time of turning are further improved.

Fourth Embodiment

Next, a fourth embodiment will be described. The fourth embodiment is basically the same as the third embodiment, but is different from the third embodiment in that the seat backrest in the second embodiment is applied thereto as the seat backrest. Therefore, in the following description, points different from those in the third embodiment will be described, and thus description the same as that in the third embodiment will be omitted.

Figure 24:
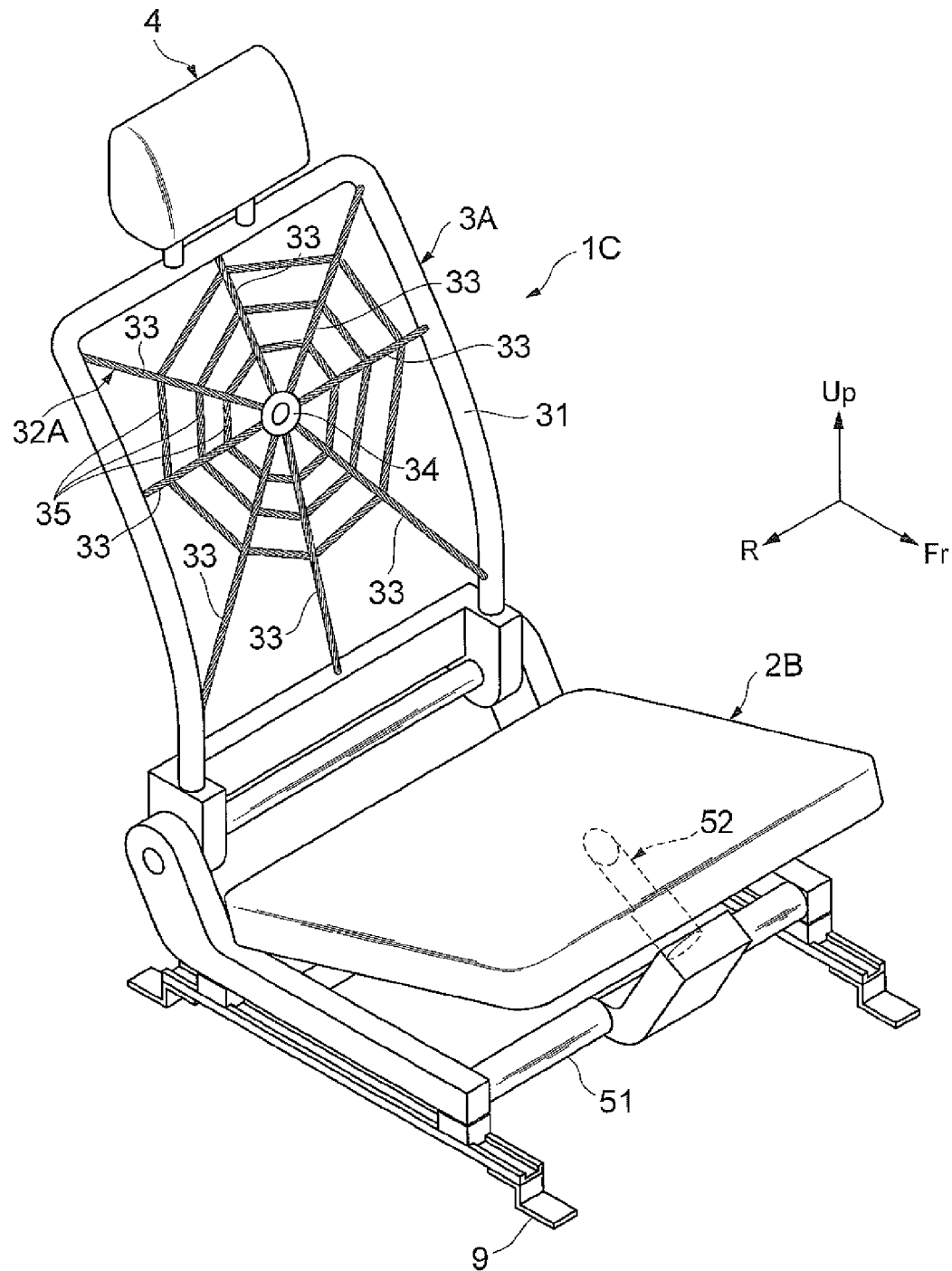
FIG. 24 is a perspective view illustrating a vehicle seat according to a fourth embodiment.

FIG. 24 is a perspective view illustrating the vehicle seat according to the fourth embodiment. As illustrated in FIG. 24, a vehicle seat 1C according to the fourth embodiment includes the seat backrest 3A in the second embodiment in place of the seat backrest 3 in the third embodiment. That is, the vehicle seat 1C includes the seat backrest 2B the same as that in the third embodiment, the seat backrest 3A the same as that in the second embodiment, and the headrest 4 the same as that in third embodiment.

As described above, according to the vehicle seat 1C in the present embodiment, in addition to an advantageous operation effect of the vehicle seat 1B according to the third embodiment, an advantageous operation effect of the vehicle seat 1A according to the second embodiment can be obtained.

The present invention is not limited to the above-described embodiments.

For example, in the above-described embodiments, a case has been described where the first string portion is connected to the connection member. However, the first string portions may be connected to each other on a radial center side without using the connection member.

In addition, in the third and fourth embodiments, a case has been described where the seat is supported in a cantilever manner. However, the seat may be supported on both the front side and the rear side of the seat, and further may be supported at three or more locations.

What is claimed is:

1. A vehicle seat comprising:
a seat backrest that has a seat backrest frame formed as an outer frame shape;
a net disposed to stretch in the seat backrest frame;
and a connection portion,
wherein the net includes a plurality of first strings which radiate radially outward from the connection portion, and
wherein the net forms a backrest surface.

2. The vehicle seat according to claim 1,
wherein, in an assembled configuration, the frame of the seat backrest has a top portion located higher in a frame vertical direction than a bottom portion, and the connection portion is located closer to the top portion than the bottom portion.

3. The vehicle seat according to claim 2,
wherein the frame further includes a first side and a second side, essentially perpendicular to the top portion and the bottom portion, and the connection portion is equidistant to the first side and the second side.

4. The vehicle seat according to claim 1,
wherein the net further has a plurality of second string portions which are connected to the plurality of first string portions.

5. The vehicle seat according to claim 4,
wherein the plurality of second string portions are arranged in an annular shape which surrounds the connection portion.

* * * * *